US011785024B2

(12) United States Patent
Karam et al.

(10) Patent No.: US 11,785,024 B2
(45) Date of Patent: Oct. 10, 2023

(54) DEPLOYING NEURAL-TROJAN-RESISTANT CONVOLUTIONAL NEURAL NETWORKS

(71) Applicant: University of South Florida, Tampa, FL (US)

(72) Inventors: Robert Anthony Karam, Temple Terrace, FL (US); Brooks Allen Olney, Tampa, FL (US)

(73) Assignee: University of South Florida, Tampa, FL (US)

( * ) Notice: Subject to any disclaimer, the term of this patent is extended or adjusted under 35 U.S.C. 154(b) by 395 days.

(21) Appl. No.: 17/208,616

(22) Filed: Mar. 22, 2021

(65) Prior Publication Data

US 2022/0303286 A1 Sep. 22, 2022

(51) Int. Cl.

| | |
|---|---|
| ***H04L 9/40*** | (2022.01) |
| ***G06N 3/08*** | (2023.01) |
| ***G06N 3/04*** | (2023.01) |

(52) U.S. Cl.

CPC ........... *H04L 63/1416* (2013.01); *G06N 3/04* (2013.01); *G06N 3/08* (2013.01)

(58) Field of Classification Search

USPC ...................................................... 726/22–25

See application file for complete search history.

(56) References Cited

U.S. PATENT DOCUMENTS

| | | | | |
|---|---|---|---|---|
| 9,721,097 | B1 | 8/2017 | Davis et al. | |
| 10,429,486 | B1 * | 10/2019 | O'Shea | H04B 1/0003 |
| 10,805,317 | B2 * | 10/2020 | Musuvathi | H04L 63/1425 |
| 10,873,456 | B1 * | 12/2020 | Dods | H04L 9/50 |
| 11,075,934 | B1 * | 7/2021 | Aldhaheri | G06N 3/048 |
| 11,218,502 | B1 * | 1/2022 | Li | G06N 3/045 |
| 11,470,098 | B2 * | 10/2022 | Jeon | H04L 63/1416 |

(Continued)

OTHER PUBLICATIONS

Mohammadpour, et al.; A Convolutional Neural Network for Network Intrusion Detection System; Proceedings of the APAN—Research Workshop 2018 (Year: 2018).*

(Continued)

*Primary Examiner* — Kambiz Zand

*Assistant Examiner* — Mahabub S Ahmed

(74) *Attorney, Agent, or Firm* — Paul Murty; Smith & Hopen, P.A.

(57) ABSTRACT

In some implementation, a system for identifying malicious attacks on a convolutional neural network (CNN) model includes a target computing system that performs classification of objects using a CNN model, and an attack identification computing system that identifies an injected neural attack. The attack identification computing system can be configured to generate, based on the CNN model and associated parameters, an ecosystem of CNN models by modifying original weights of the parameters associated with the CNN model; update the original weights of the parameters with the modified weights; store, in a secure data store, the updated weights of the parameters; generate, based on the updated weights, n update file for the CNN model; update, using the update file, the CNN model; and transmit the updated CNN model to a targeting computing system configured to detect neural attacks by an attacker computing system based on the updated CNN model.

20 Claims, 17 Drawing Sheets

(56) References Cited

U.S. PATENT DOCUMENTS

| | | | | |
|---|---|---|---|---|
| 11,616,794 | B2 * | 3/2023 | Albero | H04L 63/1425 726/23 |
| 11,652,827 | B2 * | 5/2023 | Overby | H04L 63/14 726/23 |
| 2007/0294768 | A1 | 12/2007 | Moskovitch et al. | |
| 2011/0321164 | A1 * | 12/2011 | Saxena | G06F 21/577 726/25 |
| 2017/0017793 | A1 | 1/2017 | Davis et al. | |
| 2017/0206431 | A1 | 7/2017 | Sun et al. | |
| 2018/0285740 | A1 * | 10/2018 | Smyth | G06N 3/084 |
| 2018/0351972 | A1 * | 12/2018 | Yu | H04L 63/1416 |
| 2018/0367550 | A1 * | 12/2018 | Musuvathi | H04L 63/1425 |
| 2019/0005237 | A1 * | 1/2019 | Long | G06F 21/56 |
| 2019/0007434 | A1 * | 1/2019 | McLane | G06N 3/084 |
| 2019/0080240 | A1 * | 3/2019 | Andoni | G06N 3/086 |
| 2019/0156183 | A1 | 5/2019 | Durham et al. | |
| 2019/0228312 | A1 * | 7/2019 | Andoni | G06F 18/2433 |
| 2019/0272375 | A1 * | 9/2019 | Chen | G06N 5/045 |
| 2019/0273510 | A1 * | 9/2019 | Elkind | G06F 21/562 |
| 2020/0017117 | A1 * | 1/2020 | Milton | H04W 4/021 |
| 2020/0019821 | A1 | 1/2020 | Baracaldo-Angel et al. | |
| 2020/0104717 | A1 * | 4/2020 | Alistarh | G06N 3/045 |
| 2020/0250312 | A1 * | 8/2020 | Kumar Addepalli | G06F 21/57 |
| 2020/0286587 | A1 * | 9/2020 | Israeli | G06N 3/045 |
| 2020/0311540 | A1 * | 10/2020 | Chakraborty | G06N 3/08 |
| 2020/0372301 | A1 * | 11/2020 | Kearney | G06V 10/764 |
| 2020/0372550 | A1 * | 11/2020 | Beier | G06F 40/30 |
| 2020/0402058 | A1 * | 12/2020 | Zhou | G06Q 20/385 |
| 2020/0410098 | A1 * | 12/2020 | Kolouri | G06N 3/04 |
| 2020/0410335 | A1 * | 12/2020 | Gu | G06V 10/776 |
| 2021/0011920 | A1 * | 1/2021 | Sudarsan | G06F 16/243 |
| 2021/0056404 | A1 * | 2/2021 | Goswami | G06F 18/22 |
| 2021/0073287 | A1 * | 3/2021 | Hunter | H04L 9/3239 |
| 2021/0073291 | A1 * | 3/2021 | Hunter | H04L 63/123 |
| 2021/0089924 | A1 * | 3/2021 | Kruus | G06N 3/043 |
| 2021/0097176 | A1 * | 4/2021 | Mathews | G06N 5/01 |
| 2021/0099474 | A1 * | 4/2021 | Huang | G06N 3/088 |
| 2021/0110045 | A1 * | 4/2021 | Buesser | G06N 3/088 |
| 2021/0166157 | A1 * | 6/2021 | Bhowmick | G06N 20/20 |
| 2021/0182385 | A1 * | 6/2021 | Roychowdhury | G06N 7/01 |
| 2021/0182660 | A1 * | 6/2021 | Amirguliyev | G06N 3/084 |
| 2021/0182661 | A1 * | 6/2021 | Li | H04L 41/16 |
| 2021/0194898 | A1 * | 6/2021 | Jeon | H04L 63/1416 |
| 2021/0279603 | A1 * | 9/2021 | Teran Matus | G06V 20/40 |
| 2021/0303686 | A1 * | 9/2021 | Shuai | G06V 10/454 |
| 2021/0304002 | A1 * | 9/2021 | George | G06N 3/047 |
| 2021/0374547 | A1 * | 12/2021 | Wang | G06N 3/047 |
| 2021/0385232 | A1 * | 12/2021 | Kutt | H04L 63/145 |
| 2021/0406613 | A1 * | 12/2021 | More | G06F 21/564 |
| 2022/0029971 | A1 * | 1/2022 | Gharibi | G06F 18/2113 |
| 2022/0046057 | A1 * | 2/2022 | Kutt | H04L 63/145 |
| 2022/0053005 | A1 * | 2/2022 | Liu | G06F 18/22 |
| 2022/0083662 | A1 * | 3/2022 | Grobman | G06N 20/00 |
| 2022/0108177 | A1 * | 4/2022 | Samek | G06N 3/045 |
| 2022/0122347 | A1 * | 4/2022 | Bhatt | G06T 7/0012 |
| 2022/0156563 | A1 * | 5/2022 | Zhang | G06F 18/214 |
| 2022/0180172 | A1 * | 6/2022 | Eykholt | G06F 18/231 |
| 2022/0209885 | A1 * | 6/2022 | Nguyen | G06N 3/08 |
| 2022/0253714 | A1 * | 8/2022 | Chen | G06N 3/088 |
| 2022/0269928 | A1 * | 8/2022 | Esmaeilzadeh | G06N 3/044 |
| 2022/0291739 | A1 * | 9/2022 | Ko | G06F 1/3225 |
| 2022/0292356 | A1 * | 9/2022 | Singh | G06N 3/048 |
| 2022/0358364 | A1 * | 11/2022 | Allen | G06N 5/01 |
| 2023/0039182 | A1 * | 2/2023 | Cheng | G06N 3/098 |
| 2023/0087612 | A1 * | 3/2023 | Eyole | G06N 3/063 706/25 |
| 2023/0107574 | A1 * | 4/2023 | Singh | G06N 3/04 726/23 |

OTHER PUBLICATIONS

Xiao et al.; An Intrusion Detection Model Based on Feature Reduction and Convolutional Neural Networks; IEEE (Year: 2019).*

Wei et al.; An Optimization Method for Intrusion Detection Classification Model Based on Deep Belief Network; IEEE (Year: 2019).*

Doan et al.; Februus: Input Purification Defense Against Trojan Attacks on Deep Neural Network Systems; ACM (Year: 2020).*

Liu et al.; Fine-Pruning: Defending Against Backdooring Attacks on Deep Neural Networks; Springer (Year: 2018).*

Dutta et al.; Hybrid Model for Improving the Classification Effectiveness of Network Intrusion Detection; Springer (Year: 2018).*

Diro et al.; Leveraging LSTM Networks for Attack Detection in Fog-to-Things Communications; IEEE (Year: 2018).*

Costales et al.; Live Trojan Attacks on Deep Neural Networks; down loaded from google.com (Year: 2020).*

Tang et al.; MF-CNN: a New Approach for LDOS Attack Detection Based on Multi-feature Fusion and CNN; Springer (Year: 2020).*

Basumallik, et al.; Packet-data anomaly detection in PMU-based state estimator using convolutional neural network; Elsevier (Year: 2018).*

Gao et al.; Strip: A Defence Against Trojan Attacks on Deep Neural Networks; ACM (Year: 2019).*

Samragh, et al.; Trojan Signatures in DNN Weights; down loaded from google.com (Year: 2021).*

Gu et al., "Badnets: Evaluating backdooring attacks on deep neural networks," IEEE Access, Apr. 11, 2019, 7:47230-47244.

International Search Report and Written Opinion in International Appln. No. PCT/US2022/021110, dated Jul. 7, 2022,7 pages.

Chen et al., "Adversarial attack and defense in reinforcement learning-from AI security view," Cybersecurity, Dec. 2019, 2(11), 22 pages.

Chen et al., "DeepInspect: A Black-box Trojan Detection and Mitigation Framework for Deep Neural Networks ," Proceedings of the Twenty-Eighth International Joint Conference on Artificial Intelligence Main track, pp. 4658-4664.

Gao et al., "Strip: A Defense Against Trojan Attacks on Deep Neural Networks," Proceedings of the 35th Annual Computer Security Applications Conference on—ACSAC '19, 2019, pp. 113-125.

Javaheripi et al., "CleaNN: Accelerated Trojan Shield for Embedded Neural Networks," ICCAD '20: Proceedings of the 39th International Conference on Computer-Aided Design, Nov. 2020, pp. 1-9.

Olney et al., "Diverse, Neural Trojan Resilient Ecosystem of Neural Network IP," Acm J. Emerg. Technol. Comput. Syst., Feb. 2022, 21 pages.

Wang et al., "Defending against Adversarial Attack towards Deep Neural Networks via Collaborative Multi-task Training," IEEE Transactions on Dependable and Secure Computing, Aug. 2019, 12 pages.

* cited by examiner

Algorithm 1 Algorithm for Diversifying Model M

Input: $M$, $t_p$

Output: $M_d$

```
for layer in M do
    for weight in layer do
        w ← weight
        δ_r ← w × t_p
        Δw ← Random uniform distribution [δ_r]
        Shift weight by adding Δw to w
    end for
end for
return M_d
```

FIG. 3

Table 700 Architecture of MNIST Classifier

| Layer type | Activation* | Neurons | Trainable Parameters |
|---|---|---|---|
| Conv | relu | 6 | 60 |
| Max-pooling | - | - | - |
| Conv2D | relu | 16 | 880 |
| Max-pooling | - | - | - |
| FC | relu | 120 | 48,120 |
| FC | relu | 84 | 10,164 |
| FC | softmax | 10 | 850 |
| *Total* | - | - | 60,074 |

*Note: Original LeNet architecture uses Tanh activations instead of ReLU.

FIG. 7

Table 800 Hyperparameter configurations

| Batch size | Epochs | Learning Rate |
|---|---|---|
| 128 | 50 | 1e-3 |
| 128 | 25 | 5e-3 |
| 1024 | 100 | 1e-3 |
| 1024 | 50 | 5e-3 |

FIG. 8

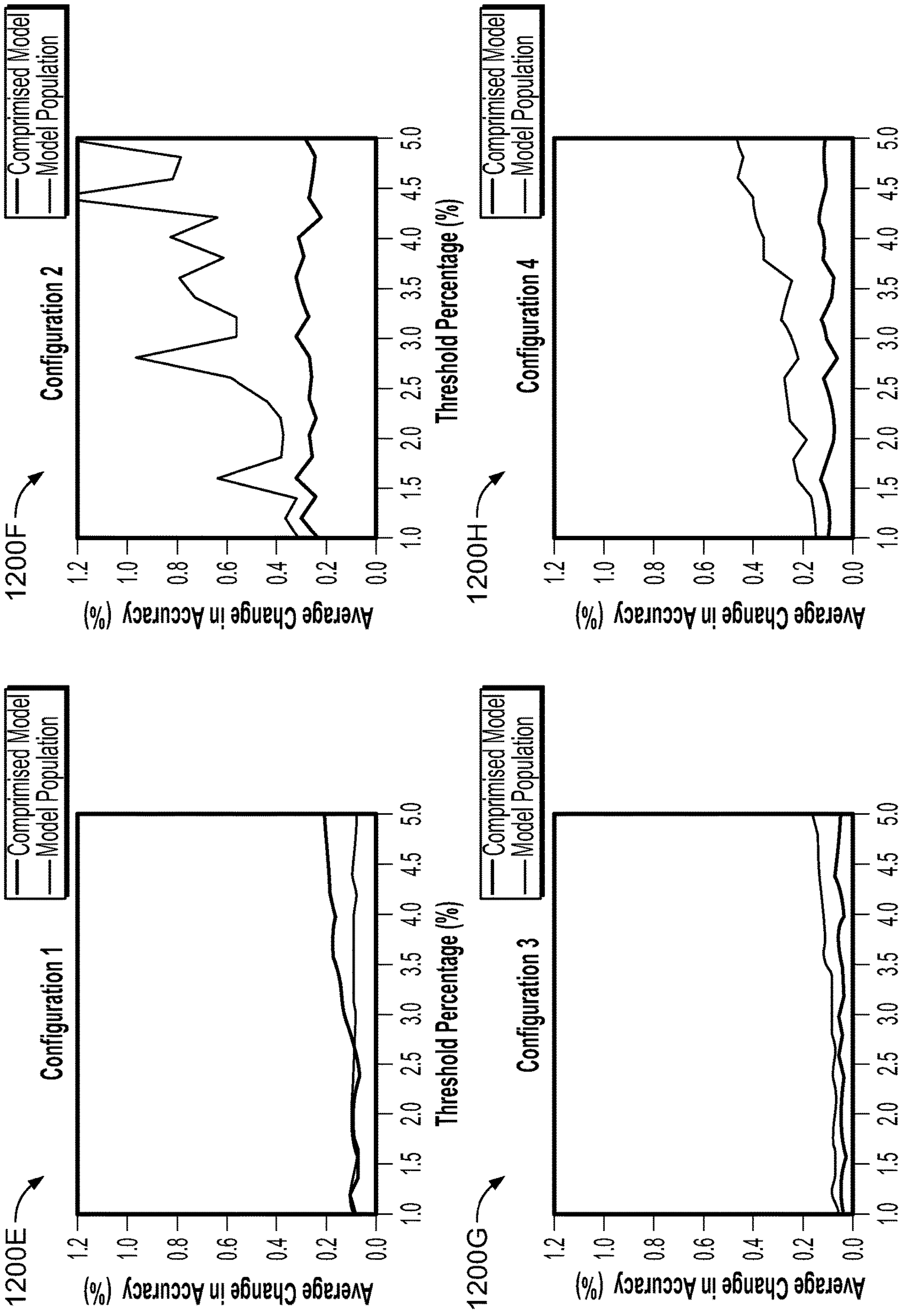
FIG. 12 Contd.

DEPLOYING NEURAL-TROJAN-RESISTANT CONVOLUTIONAL NEURAL NETWORKS

TECHNICAL FIELD

This document generally describes devices, systems, and methods related to detecting neural network models that include malicious features (i.e., neural network model trained using some malicious data), also referred to as "Neural Trojans."

BACKGROUND

Modern systems, such as self-driving vehicles, increasingly rely on machine learning (ML) and/or artificial intelligence (AI) for making critical runtime decisions. Convolutional neural networks, for example, can process images and perform classification tasks in self-driving vehicles and other modern systems. Such neural networks can include models that are generated from training data, which can include input data that is correlated to classified or other identified output information. Models can include, for example, multiple different layers that translate different features from the input data into corresponding classifications or identified output information. Once a model is trained, it can then be used to process input data to determine appropriate classifications or other output information.

Neural networks have been found to be susceptible to attack, particularly when potentially malicious training data is injected into the training process. Such attacks, which are also referred to as "Neural Trojans," can be successful in accomplishing their malicious objectives because they can be stealthy and can be difficult to detect. For example, Neural Trojans can cause stealthy changes to a neural network configuration (i.e., neural network model), thereby infecting systems, such as self-driving vehicles that rely on accurate input classification for proper functionality. Attackers can, for instance, extract training data for a neural network used in systems like self-driving vehicles, modify the training data, and send a Trojan-inserted configuration back to the original system.

SUMMARY

The document generally describes deploying an ecosystem of neural network configurations such that an impact of Neural Trojans can be amplified to more easily detectable levels. The disclosed technology can improve deployment security for systems such as self-driving vehicles to enable more rapid detection and mitigation of stealthy attacks like Neural Trojans. The disclosed technology can also provide for more rapid detection of Neural Trojans in different applications of neural networks for different devices and/or systems (e.g., IoT devices, devices using artificial intelligence at the edge, etc.).

Stealthy attacks can be targeted at retraining a neural network, such as a convolutional neural network (CNN) of a system. Such attacks can reduce classification accuracy or cause the system to confuse or mix up classification of objects. For example, a CNN of a self-driving vehicle can be retrained by an attacker to classify objects differently than the original training model. In the self-driving space, this can cause safety concerns. Using techniques such as stochastic parameter mutation, the disclosed technology can prevent a spread of causative attacks, such as Neural Trojans and data poisoning. The attacks can be prevented from spreading to other devices or systems in an ecosystem.

Using stochastic parameter mutation and delta-update techniques, the disclosed technology can provide for making small changes to some parameters of a neural network that do not impact overall accuracy of the system. The disclosed technology may not provide for changing a structure of the network. The small changes can be treated like noise, which the system can be resistant to. When used in combination with update techniques described herein, networks can be updated within an ecosystem to prevent the spread of Neural Trojans from one network and one system to another network and system in the ecosystem.

The disclosed technology can provide a practical threat model for which neural network Trojans can be applied. A CNN can be deployed as an ecosystem, which can be derived from an original CNN through stochastic parameter mutation. Using the delta-update technique, the disclosed technology can provide for updating CNNs in a field, which can expose less information about a classifier to an attacker and effectively thwart a poisoning or neural Trojan-based attach on the model ecosystem. With adequate self-check procedures and pooled validation across the ecosystem, a stealthy attack on one model may not be translated to any other models within the diversified ecosystem while maintaining the stealthy nature of the attack.

Particular embodiments described herein include a system for identifying malicious attacks on a convolutional neural network (CNN) model that includes a target computing system that performs classification of objects using a CNN model, wherein the target computing system is configured to generate the CNN model using a training dataset; and an attack identification computing system that identifies the injected neural attack. The attack identification computing system is configured to: receive, from the target computing system, the CNN model and parameters associated with the CNN model; generate, based on the received CNN model and the parameters, an ecosystem of CNN models, wherein generating the ecosystem comprises modifying original weights of the parameters associated with the CNN model; update the original weights of the parameters associated with the CNN model with the modified weights; store, in a secure data store, the updated weights of the parameters associated with the CNN model; generate, based on the updated weights, an update file for the received CNN model; update, using the update file, the received CNN model; and transmit, to the target computing system, the updated CNN model. The targeting computing system is further configured to (i) use the updated CNN model and (ii) detect neural attacks by an attacker computing system against the updated CNN model based on the updated CNN model.

Such a system can optionally include one or more of the following features. The neural attacks can include Neural Trojan attacks that involved injecting malicious data into the training dataset. The parameters associated with the CNN model can include the training dataset of the CNN model. Generating the ecosystem of CNN models can include applying stochastic parameter mutation to the parameters associated with the received CNN model. The generating the ecosystem of CNN models can further include shifting, at a first time and based on user-defined values, weights of the parameters associated with the received CNN model; and shifting, at a second time and using a random number generator, the weights of the parameters associated with the received CNN model. Updating the original weights of the parameters associated with the CNN model can include adding the modified weights to the original weights. Generating the update file for the received CNN model can include retraining the received CNN model with the updated weights; determining, based on the retraining, matrices of the updated weights before and after the retraining; and XOR'ing, based on the matrices, the updated weights in the update file. Updating the received CNN model can include transmitting, to the target computing system, deltas of the updated weights. The target computing system can be part of a cluster of other target computing systems, wherein the target computing system is the same as the cluster of other target computing systems. Modifying the original weights of the parameters associated with the received CNN model can include shifting the original weights by a predetermined threshold value. The predetermined threshold value can be 1%. The attack identification computing system may further be configured to encrypt the update file; and transmit, to the target computing system, the encrypted update file. The target computing system can be configured to: receive, from the attack identification computing system, the encrypted update file; decrypt the encrypted data file; and update the CNN model using the decrypted data file. The target computing system can be configured to classify objects in an environment using the CNN model. The target computing system can be at least one of a self-driving vehicle, an Internet of Things (IoT) device, and an artificial intelligence (AI) device. The targeting computing system can further be configured to transmit an alert to the attack identification computing system in response to detecting the neural attacks, the attack identification computing system can further be configured to (i) receive the alert from the targeting computing system and (ii) transmit identification of the neural attacks to other computing systems using the CNN model.

The devices, system, and techniques described herein may provide one or more of the following advantages. For example, the disclosed technology can provide for amplifying a Trojan's malicious impact to more easily detectable levels. Making the impact more easily identifiable can provide for more rapid response and mitigation of such attacks. This can be advantageous to prevent safety of self-driving vehicles from being compromised by Trojan attacks. Moreover, the disclosed technology can ensure sufficient levels of diversity and resilience to infection from other models of systems that can be updated in an ecosystem without compromising functionality of any of the systems in the ecosystem.

As another example, the disclosed technology can use a process called stochastic parameter mutation to cause confusion for an attacker. The disclosed technology can provide for updating a system, such as a self-driving vehicle, by creating confusion for the attacker to initiate an attack. For example, using stochastic parameter mutation, the disclosed technology can modify weights at an input layer to more easily detect a neural Trojan and stop a spread of the Trojan attack. Updating the system may not compromise weights and other parameters used in a convolutional neural network (CNN) of the system. Therefore, the disclosed technology can focus on resisting a spread of causative attacks rather than merely identifying whether the system has been attacked or otherwise compromised.

Attacks can be identified before they spread to similar CNNs or training models of other systems and without having prior knowledge about such attacks. The disclosed technology can defend against neural Trojan attacks without having prior knowledge of such attacks. Using techniques such as stochastic parameter mutation, the disclosed technology can stop a spread of the attack to connected systems and can defend against attacks initiated through fake update requests.

The details of one or more implementations are set forth in the accompanying drawings and the description below. Other features and advantages will be apparent from the description and drawings, and from the claims.

BRIEF DESCRIPTION OF THE DRAWINGS

FIG. 3 is an algorithm for diversifying a convolutional neural network (CNN) model.

FIG. 7 is a table depicting a structure and parameters for the CNN model described herein.

FIG. 8 is a table depicting hyperparameter configurations used with the CNN model.

Like reference symbols in the various drawings indicate like elements.

DETAILED DESCRIPTION OF ILLUSTRATIVE EMBODIMENTS

Figure 1:
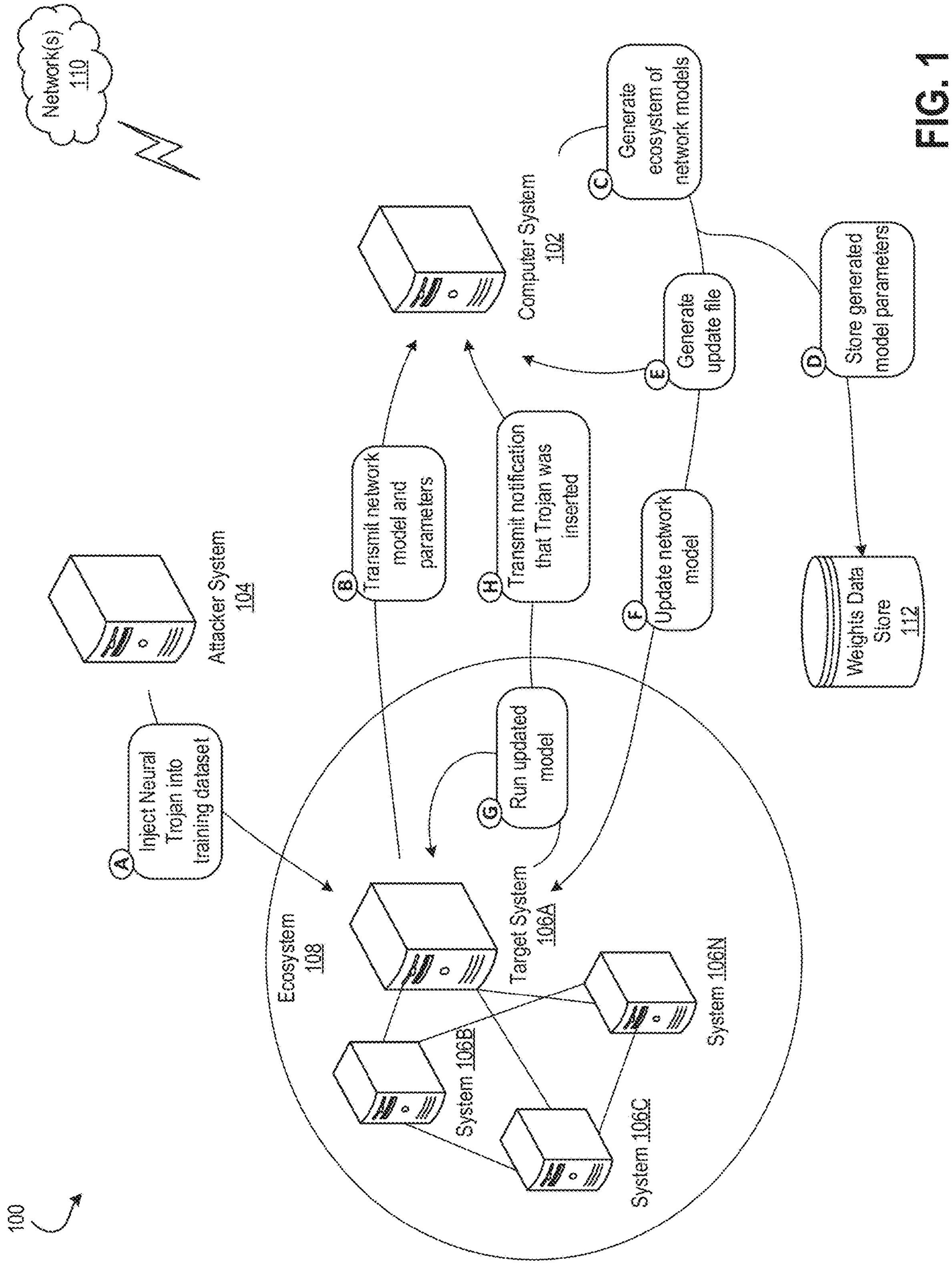
FIG. 1 is a conceptual diagram of a system for identifying neural Trojan attacks, as described throughout this disclosure.

This document generally relates to more rapid detection and mitigation of stealthy neural Trojan attacks on systems including but not limited to self-driving vehicles. Neural networks are increasingly used in industries such as healthcare, security, speech recognition, and computer vision. Advancements in the automotive industry also brought about the concept of self-driving cars, which can rely on neural networks for processing their surroundings and making decisions. Such autonomous systems can be equipped with high performance and tolerant deep learning algorithms. Operational failure of these systems can lead to injury and property damage. Security concerns can also arise when untrusted ML models are deployed in systems without knowledge of how the models might have been tampered. Security concerns can also arise when ML models are deployed and operating in untrusted environments.

Adversarial machine learning can be used to expose and mitigate security vulnerabilities in ML and/or AI algorithms and their implementations. Data poisoning and Neural Trojans can enable an attacker to change behavior and performance of a Convolutional Neural Network (CNN) by altering some input data during training. Such attacks can have negative impacts in the field, such as with self-driving vehicles. Attacks on ML systems can be categorized into based on influence of the attack: 1) causative attacks: which can aim to disrupt a learning process of the network at training time, and 2): evasion attacks: which can aim to exploit a classifier during inference. Poisoning can be a causative attack that provides contaminated or mislabeled data points in a training set, degrading accuracy of the classifier. Evasion attacks can be an example of exploratory attacks that attempt to construct input samples that can be designed to trick the classifier into interpreting them as something different, or just to gain information about how the ML algorithm works.

While poisoning techniques can evaluate their strength based on an error rate induced on the classifier, Neural Trojans can be a sub-category of poisoning techniques that embody similar characteristics to that of hardware Trojans. They can be difficult to detect because they activate by a certain set of inputs that are only known to the adversary. Threats posed by such attacks can be catastrophic. For instance, a neural network IP may be used in an autonomous vehicle to classify street signs, and an embedded Trojan may cause the classifier to recognize a stop sign as a 75 mph speed limit sign when a sticker is on the sign.

In addition to the practicality of the attack itself, there may be thousands or even millions of copies of that model in operation in an ecosystem. If an attacker can successfully mount an attack on one device, then they can also transfer this attack to other identical or similar devices. Typically, transferability of an adversarial attack refers to the ability of an adversarial example to fool multiple different models with different architectures, or for a poisoning attack to be applicable to multiple different network architectures.

Backdooring or Trojaning a neural network can involve training/retraining a network with a contaminated dataset. The training dataset can contain samples embedded with the Trojan trigger, where the Trojan trigger can be "noise" that is drawn from a different distribution than the uncontaminated training data. This trigger, when added to a sample image, can be indistinguishable to a human. However, the model can be inherently programmed through the training process to recognize this pattern and classify the sample as whatever the attacker wishes it to. Integration of the Trojan should have a minimal effect on the classification accuracy on normal testing data. Because the network performs to spec, and the trigger does not activate the Trojan when testing on drawn from the same distribution as the original training data, the Trojan can be difficult to detect.

Neural Trojans have some similar properties to hardware Trojans. For example, for most inputs, the neural network IP performs to specification, and activation of the Trojan can drastically alter functionality of the neural network IP. However, a hardware Trojan may be designed to trigger upon a particular (sequence of) input(s) that may occur naturally, without requiring the attacker to manually supply the trigger input (sequence). For a neural Trojan, the input images must contain the Trojan trigger for it to activate, which can be an abnormal occurrence because the trigger is a signature that comes from a different distribution than anything it has seen before. This means that, the attacker must not only have access to (or replicate) the training data, they must also have the ability to influence the input data during runtime.

Sometimes, a neural network IP can be backdoored by adding some malicious examples to the dataset containing a pattern of bright pixels—without compromising accuracy of the model. Classifiers can also be caused to incorrectly label stop signs that contain a sticker with the backdoor on the bottom of the sign. Some Trojan attacks can select specific neurons that will be used to trigger the Trojan, and craft a Trojan trigger that maximizes output values of the selected neurons. A bit-level attack can also be performed by embedding a software Trojan within redundant space in a binary representation of the network. The Trojan can be extracted from the network and executed on the target system to perform some malicious action. For example, a "fork bomb" can be embedded in the neural network and executed. A trigger can also be generated that is specifically constructed to find "vulnerable" bits of weights. Bit-flip attacks (e.g. row-hammer) can then be performed to those bits, causing the network to classify all inputs to a target class. For example, using that type of attack, a network can incorrectly classify 92% of test images to a target class with only 84 bit-flips out of 88 million total bits. Trojan attacks can also include label flip attacks, a poisoning attack tactic. Label flip attacks can simply require labels from a training set to be flipped. The result can cause the classifier to mislearn certain features across mislabeled classes. As described herein, an implementation of the label flip attack can be used as a baseline to simulate an increase of error rate after retraining due to its ease of implementation and architecture agnostic nature.

Therefore, the disclosed technology provides for deploying a CNN as an ecosystem of variants, rather than a singular model. The disclosed technology can leverage architecture of a neural network for security purposes. The ecosystem can be derived from an original trained model, and though every derived model can be structurally different, the models can be functionally equivalent to the original and each other. Therefore, the disclosed technology can provide for an ecosystem of structurally different but functionally equivalent variants of the same model for deployment. For large networks, for example, millions of variants can be produced that are structurally different but functionally equivalent.

Stochastic parameter mutation can be used, where weights $\theta$ of the original model can be shifted by a small, random amount. A delta-update procedure can also be used, which can function by XOR'ing all parameters with an update file containing $\Delta\theta$ values. Updating the model using the techniques described herein can amplify presence of Neural Trojans across every system and/or device in the ecosystem. This technique can be effective against transferability of a neural Trojan to the greater ecosystem by amplifying the Trojan's malicious impact to easily detectable levels; thus, deploying a model as an ecosystem can render the ecosystem more resilient against a neural Trojan attack.

Referring to the figures, FIG. 1 is a conceptual diagram of a system 100 for identifying neural Trojan attacks, as described throughout this disclosure. The system 100 can include a computer system 102, an attacker system 104, and a target system 106A. The target system 106A can be in communication with or otherwise part of a cluster of systems 106B-N within an ecosystem 108. The systems 102, 104, and 106A-N can communicate via network(s) 110 (e.g., wired and/or wireless).

The target system 106A can be a commercial product that contains a neural network for inference as a critical component of the system. A practical example of the target system 106A can be a self-driving car, where a neural network inference engine (e.g., refer to FIG. 14) can be used for the vehicle's ability to see and interpret street signs, markers, pedestrians, other cars, etc. In this scenario it can be critical that the system 106A be as fault tolerant as possible since misclassification during a key moment in time may have catastrophic consequences. The target system 106A can also have some baseline security protocols in place to prevent against common means of tampering. For example, when a remote update of the system 106A is in progress, the system 106A may evaluate the neural network before and after applying the update on several different metrics related to performance, e.g., a built-in self-test (BIST). Example metrics can include loss and accuracy on a validation set, statistical comparison of the weight histograms, and a checksum of the update file. Presence of these basic security protocols can be assumed as a baseline for deployment of the system 106A.

The attacker system 104 can implement a malicious update that bypasses security protocols in the target system 106A. The attacker system 104 can also plan to spread that update to as many other devices or systems 106B-N in the ecosystem 108 as possible. In general, this update can be referred to as a neural Trojan. The malicious intent of the Trojan can be to induce targeted misclassification at a very low rate such that it is extremely hard to detect by the BIST of the target system 106A. An example would be an attacker system 104 that has its own self-driving car and learned how to breach its security mechanisms and send Trojan'ed updates to other users that own the same model of vehicle (e.g., the systems 106B-N) in the ecosystem 108.

It can be assumed that the attacker system 104 has access to the target system 106A. With this access, the attacker system 104 can apply inputs to the system 106A's network and observe outputs to that network. This can be referred to as a black-box attack, where the attacker system 104 has limited to no knowledge about the architecture of the system 106A, but can observe inputs and outputs. Through trial and error, the attacker system 104 can extract their own copy of the classification model by observing inputs and their corresponding outputs.

To mount the neural Trojan described throughout this disclosure (e.g., refer to A in FIG. 1), the attacker system 104 requires access to a subset of training data for the network model of the target system 106A, or at least some data for a given application that follows the same distribution as the original training data. Using the training data, the attacker system 104 can mislabel some subset of that data corresponding to target class labels, and retrain the network of the target system 106A. The attacker system 104 can then generate and apply the update to the system 106A, given that it can circumvent the baseline security protocols of the target system 106A.

As shown, the attacker system 104 can inject a neural Trojan into a training dataset of the target system 106A (A). The attacker system 104 can inject the neural Trojan at any point described herein (e.g., before, in between, or after any one or more of A-H). The target system 106A can transmit its network model and associated parameters to the computer system 102 (B). The network model can be used for a convolutional neural network (CNN). Using the received model and parameters, the computer system 102 can generate an ecosystem of network models (C). The computer system 102 can also store generated model parameters associated with the generated ecosystem in a weights data store 112 (D). Moreover, the computer system 102 can generate an update file for the network model of the target system 106A (E). The computer system 102 can update the network model of the target system 106A using the update file (F). The target system 106A can then run the updated model (G). The updated model can, as described herein, make noticeable any injections of Neural Trojans by the attacker system 104 or other attackers. Therefore, when a neural Trojan is inserted into the training dataset for the target system 106A (e.g., at A), the target system 106A can transmit a notification to the computer system 102 that the Trojan was in fact inserted into the training dataset (H).

Figure 2:
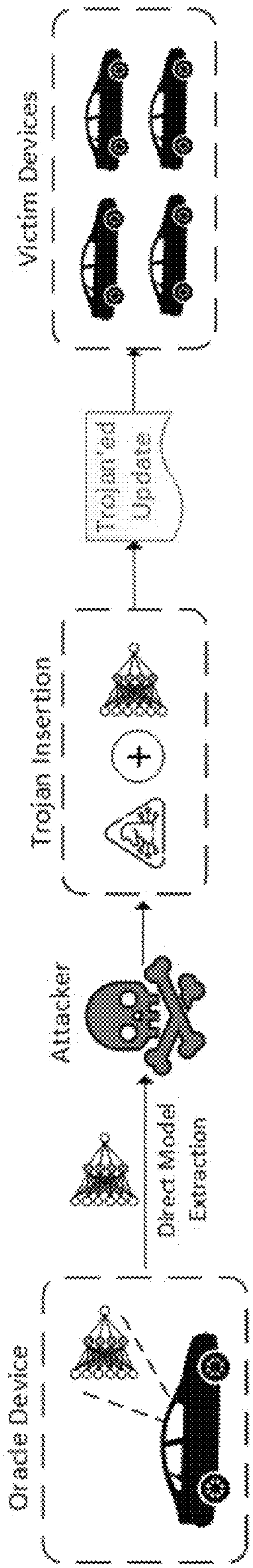
FIG. 2 is an overview of a threat model.

FIG. 2 is an overview of a threat model. As shown, an attacker can gain access to an "oracle" device. The attacker can extract a classification model from the oracle device. The attacker can then mount a Trojaning attack on this extracted copy of the classification model and generate a malicious update for the oracle device. If the malicious update achieves the attacker's goals, then the attacker can proceed by uploading the malicious update to one or more other identical devices that can be discoverable over a network.

FIG. 3 is an algorithm for diversifying a convolutional neural network (CNN) model. CNNs can require a large number of trainable parameters (e.g., weights, activations, bias terms, etc.). As an illustrative example, AlexNet has a total of 62,378,344 trainable parameters. Assuming that the network parameters are in form of 32-bit floating point, a total size of an AlexNet model can be estimated around 237 MB. The representation of the network in binary can be ambiguous, due to structure and organization of the weights due to network architecture, as well their binary representation. Because of the nature of floating point numbers and how they are structured, small changes to a value may result in an avalanche effect similar to that in the field of Cryptography, where, a small change in a decimal value can cause a large change in the binary representation of that number. The behavior of floating point numbers and ambiguity of the model's weights can be leveraged, as described herein, to create a diverse ecosystem of classification models through stochastic parameter mutation. With a CNN model M trained on $D_t$:$\{x_i, y_i\}_{r\times 1}{}^k$, and a user-defined shifting percentage threshold $t_p$, the process can be formalized as depicted in the algorithm of FIG. 3.

Figure 4B:
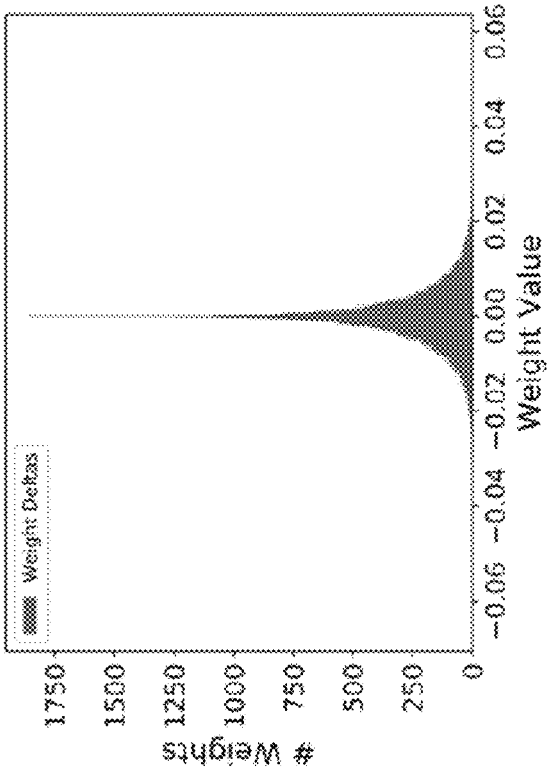
FIGS. 4A-B are graphical depictions of weight distribution for the CNN model described herein.
Figure 4A:
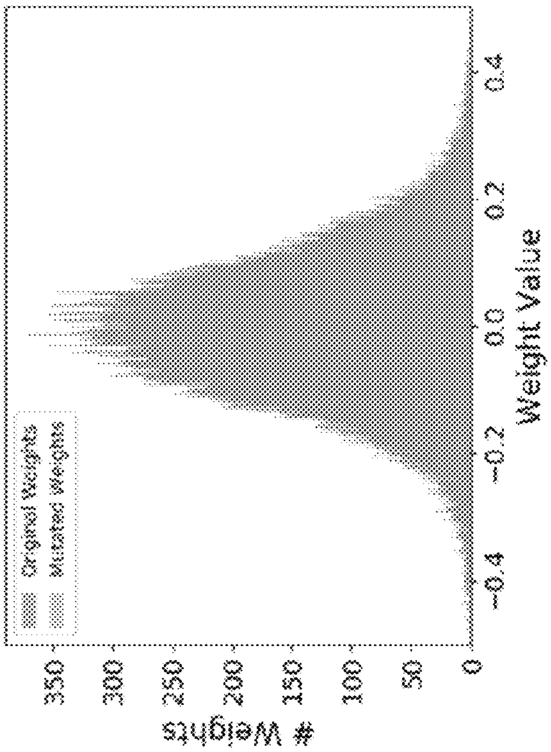

FIGS. 4A-B are graphical depictions of weight distribution for the CNN model described herein. FIG. 4A depicts a histogram of weights before and after stochastic parameter mutation can be applied. FIG. 4B depicts a histogram of Δw values. The results depicted in FIGS. 4A-B can be generated using $t_p$=0.10 (10% diversity threshold). Referring to both FIGS. 4A-B, the distribution of weights in a neural network can be determined by many different aspects of a given application, such as architecture of the classifier, training data, and regularization types/parameters. That being said, weights of the network can typically follow a gaussian distribution with small decimal values (e.g., $w_i$=[−0.015, 0.015] for AlexNet). The process and techniques described herein can alter the distribution of the weights in a nonlinear fashion.

Figure 5C:
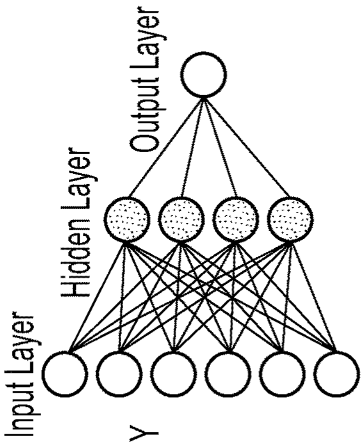
FIG. 5C is an example 1-layer feedforward network with hidden neurons.
Figure 5B:
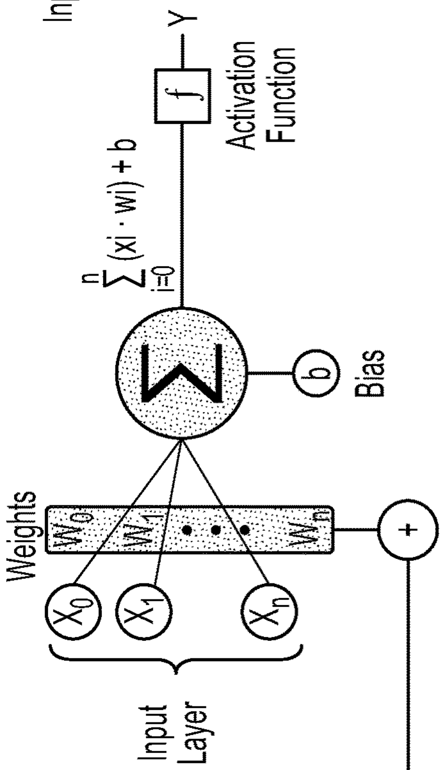
FIG. 5B is a diagram of a neuron, with the stochastic parameter mutation process applied on the neuron weights.
Figure 5A:
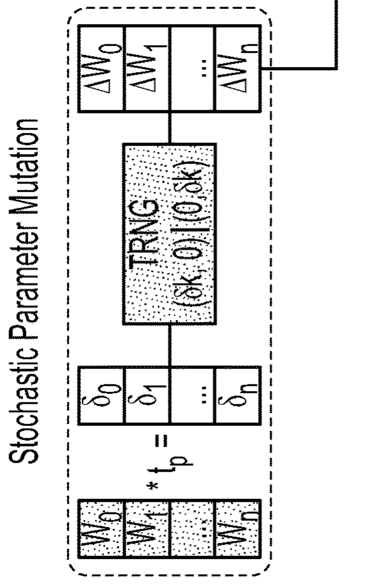
FIG. 5A is a diagram of stochastic parameter mutation as applied to neuron weights.

FIG. 5A is a diagram of stochastic parameter mutation as applied to neuron weights. FIG. 5B is a diagram of a neuron, with the stochastic parameter mutation process applied on the neuron weights. FIG. 5C is an example 1-layer feedforward network with hidden neurons. Referring to the FIGS. 5A-C, shifting the weights can be done on a per-weight basis, with a range specified by $t_p$. Applying this shift range to all the weights at once can result in some weights being shifted by a greater value than intended, which can negatively affect accuracy. A random number generator can also be utilized for computing the shift amount $\Delta w$ to ensure that every model $M_d$ generated from M can be unique. With the user-defined value $t_p$, this shift amount can be computed as a random value within the range of 0 and wx $t_p$, meaning that if the user supplies a value of 0.01 (1%), then every weight in M can be shifted by 1% of that weight's value. Because the shifting can be done randomly, there can be a non-linear relationship in the distribution of weights from M to $M_d$, as shown in FIGS. 5A-C.

In FIG. 5A, the weights can first be multiplied by the user-defined threshold $t_p$ to obtain $\{\delta_0, \delta_1, \ldots, \delta_n\}$, which can then be passed into a pseudo-random number generator (PRNG) to supply values for $\Delta W_k$. The random PRNG can produce values within the ranges of $(\delta_k, 0)$ and $(0, \delta_k)$ for values of $\delta_k$ that are negative or positive, respectively. The resulting values can be added to the original weights, which is effectively mutating the original weights. In FIG. 5B, output can be computed by summing a dot product of the input layer with the weights. An activation function can then be applied. Finally, as shown in FIG. 5C, an example 1-layer feedforward network can include hidden neurons within a hidden layer between the input and output layers.

Figure 9A:
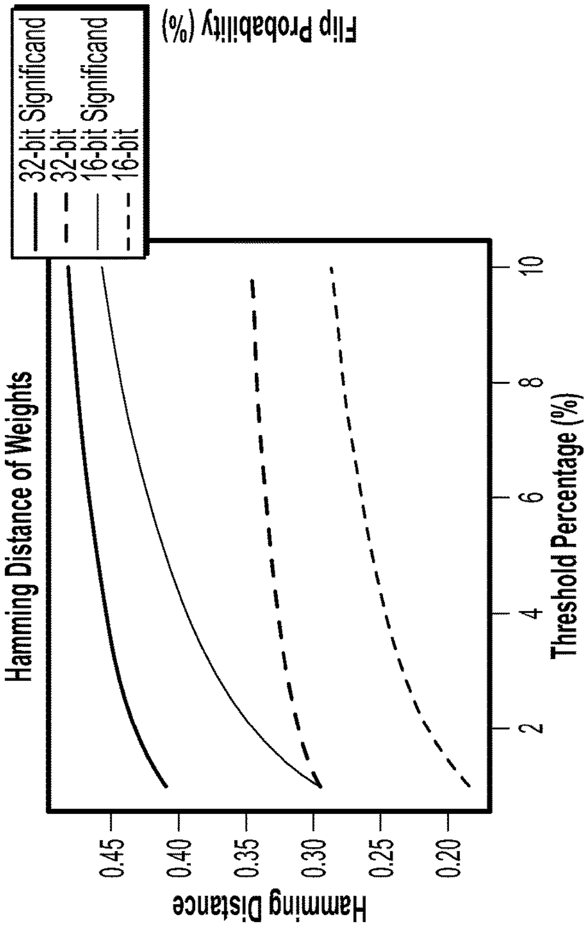
FIGS. 9A-C depict hamming distances between weights in the CNN model when using the techniques described herein.
Figure 9B:
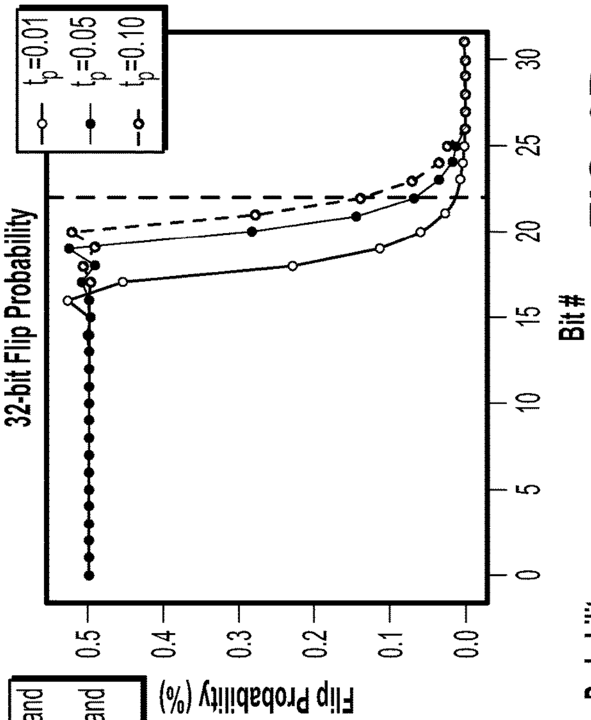
Figure 9C:
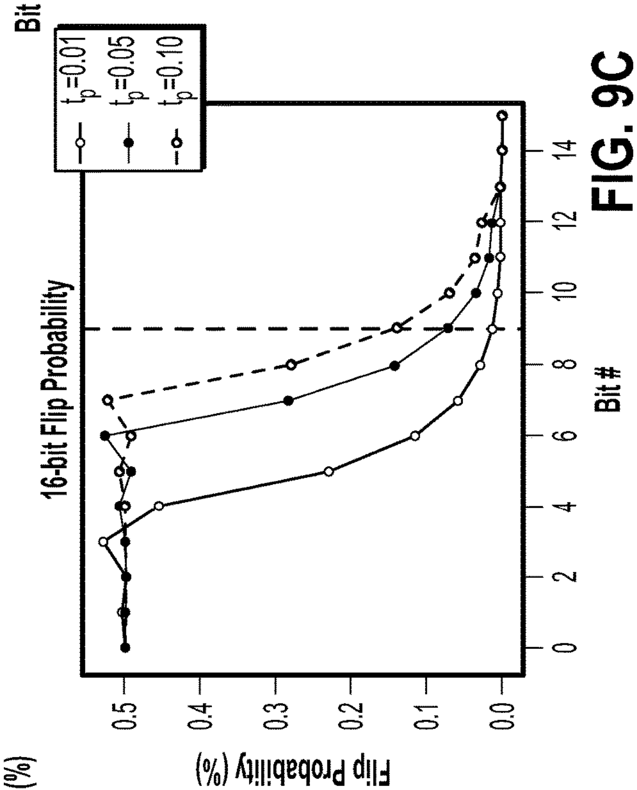

Despite the shifting of network parameters described in reference to FIGS. 5A-C, the network can retain a nearly identical accuracy on testing data to the original model, with a relatively high average hamming distance (HD) between M and $M_d$, which is shown in FIGS. 9A-C. The range of values for $\Delta w$ can be between $\delta r$ and 0, rather than $+/-\delta r$. This is because for instances where the weights are shifted by a +/− amount, there can be a more pronounced effect on accuracy of the resulting model. The more pronounced effect on accuracy can be due to the polarity of weights on the inputs to a given neuron. If negative weights become more positive and vice versa, then the shift in the decision boundary for the neuron can be much larger. In addition to this range, stochastic parameter mutation, in some implementations, can be applied only to weights, and not bias terms. The results for poisoning trials can be nearly identical, but omitting the bias terms can also have a positive impact on baseline accuracy.

Figure 6A:
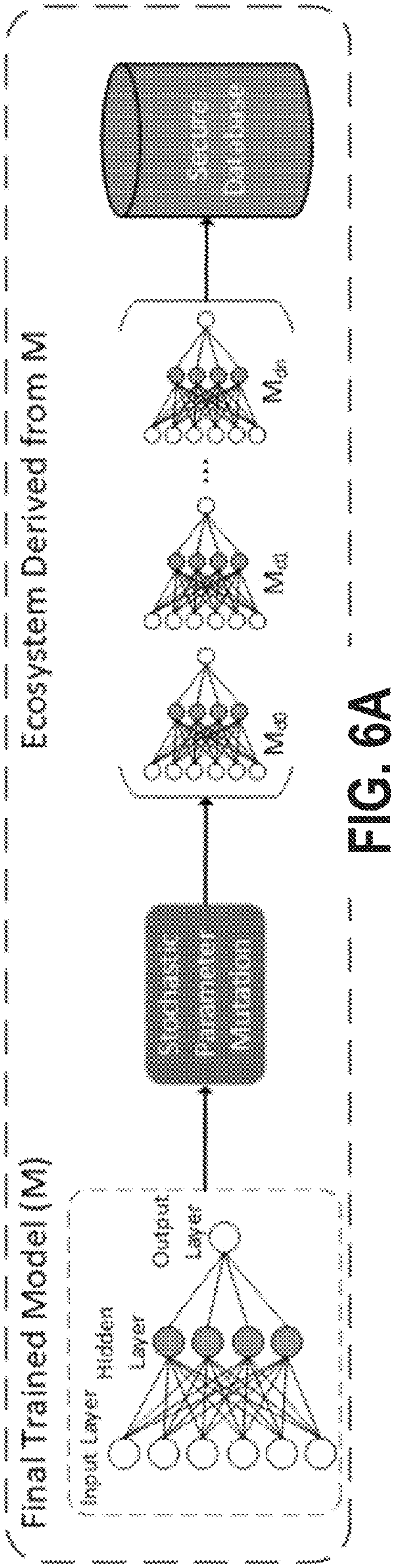
FIG. 6A is a diagram of overall flow of the proposed methodology.

FIG. 6A is a diagram of overall flow of the proposed methodology. As shown, the final network M can be trained. Stochastic parameter mutation can be applied to the weights to derive n copies of the model M. These weights can then be stored in a secure database for future deployment. Thus, the ecosystem can be derived from M and the weights for each network in the ecosystem can be stored. In some implementations, storing the weights/parameters can incur a total storage requirement of n*(size of M). However, this storage requirement can be alleviated by applying one or more model compression techniques. Storing the parameters for each model in the ecosystem can be advantageous to allow for issuing personalized, secure updates to the models in the ecosystem.

Figure 6B:
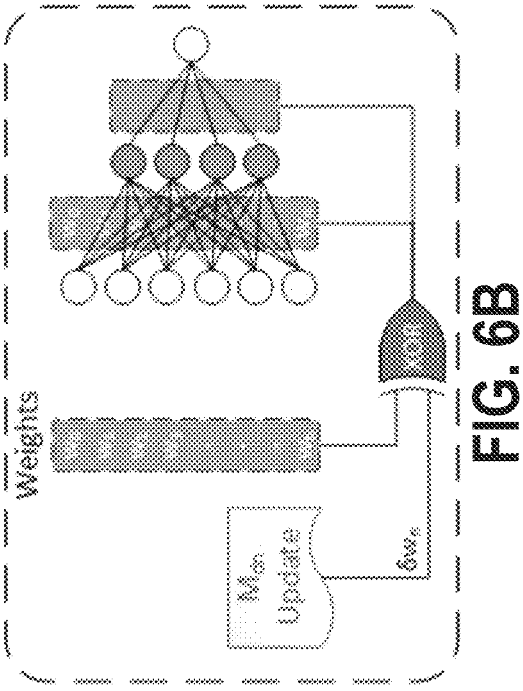
FIG. 6B is a diagram of an XOR-update procedure.

FIG. 6B is a diagram of an XOR-update procedure. Traditionally, neural network models can be updated by replacing a binary file of the network itself. Weights can be stored in a file and loaded on demand only if the structure of the network has not been changed between initial deployment and a future update. Transmission of this network over the internet can unintentionally exposes the model to threats from a network-based attack, where an attacker may intercept the model, and maliciously modify it before continuing transmission to the target device or system. As a result, this traditional update procedure can be infeasible due to security and privacy restrictions.

Therefore, the XOR-update procedure described herein can be used to address these vulnerabilities. Using this procedure, deltas of the weights, rather than the entire weights themselves, can be transmitted to the target device or system containing the network. Instead of replacing all of the weights by loading the binary file, the binary file can be loaded into memory, and the weights can be updated by XOR'ing each weight with its corresponding value in the update file, as shown in FIG. 4B.

The process of generating an update file for a network can be as follows: first, the model can be retrained with new data, or different/new parameters that have been chosen to improve performance of the network; next, the update file can be generated by taking matrices of weights before and after retraining and XOR'ing them together. This process can be advantageous for two reasons. First, an amount of data potentially exposed to an attacker monitoring the network can be minimized, with no way for the attacker to infer what the actual weights are. Second, an ability to update a neural network's weights can be preserved due to the XOR functionality.

Figure 6C:
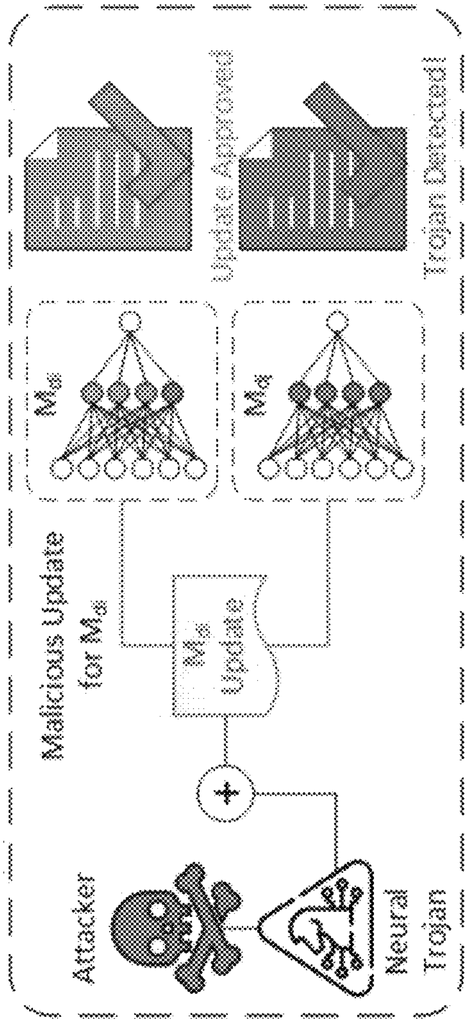
FIG. 6C is a diagram depicting that an attacker determined how to insert a Trojan into a CNN model's update file.

FIG. 6C is a diagram depicting that an attacker determined how to insert a Trojan into a CNN model's update file. Using the update procedure as described herein (e.g., refer to FIGS. 6A-B) may not preclude additional precautions or layers of security, such as encrypting the update file prior to transmission. Stochastic parameter mutation, in conjunction with the XOR-based update procedure described herein, can provide a 1-to-1 relationship between a model and its update file. Because of the non-linearity associated with randomly shifting the weights, taking an update for model $M_{di}$ and instead apply it to model $M_{dj}$ can introduce unintended functionality to $M_{dj}$ either through a degradation of accuracy or even sabotaging functionality of the model in general. This can also scale to a practical threat scenario where an attacker attempts to Trojan multiple networks.

As shown in FIG. 4C, an attacker Trojan'ed $M_{di}$ but that same update raised flags when applied to $M_{dj}$ because of an inherent sabotage caused by the XOR mismatch. In the event that optimizations/improvements can be made to accuracy of the original model, all models in the ecosystem can be updated to share these improvements. This can be done by first taking the new version of M and applying stochastic parameter mutation to derive a new ecosystem $M_{ec}=\{M_{d0}, M_{d1}, \ldots, M_{dn}\}$. Next, each model can be mapped from the new ecosystem to each model in the old ecosystem by XOR'ing their parameters. This can derive an update for each model that can be deployed to the ecosystem. The new parameters can overwrite what currently exists in the database or data store described herein.

In addition to the XOR-based update process described herein, an additional mechanism for evaluating change in accuracy and/or training parameters can be implemented as a safeguard against a potentially malicious update. No update, in production, can have a negative impact on accuracy of the model. So, the device or system running the network can attempt to update the model via the XOR-based process, and test accuracy before and after this update. If the accuracy falls by a certain amount (or even at all), then that update can be considered malicious and discarded.

FIG. 7 is a table 700 depicting a structure and parameters for the CNN model described herein. As an illustrative example, a CNN can be built based on a LeNet-5 model for MNIST digit classification. The full structure of the parameters are shown in Table 700 in FIG. 7. The model can have two 2D convolutional layers with maxpooling layers after them, two fully-connected layers, and a softmax layer. On average, this model can achieve 99% accuracy on a test set with a relatively short amount of training time.

The illustrative example can be applied to the MNIST classifier and quantized to single-precision (32-bit) and half-precision (16-bit) floating point representation to demonstrate scalability of the disclosed technology. Software implementation for the disclosed technology can be done using libraries such as Keras, which is a high level library for interfacing with Tensorflow. Processing these workloads can be done using any one or more computing configurations, including but not limited to an Nvidia Titan V GPU on a Gaivi computer vision cluster.

FIG. 8 is a table 800 depicting hyperparameter configurations used with the CNN model. As described herein, a label flipping attack (LFA) can be simulated in the illustrative example. The LFA can target samples of targeted labels performed during a retraining phase of the network. The batch size can smooth the results of the LFA. With a higher batch size, the number of contaminated samples in a batch can be lower, meaning that the resulting loss computed when performing back-propagation can be lower, and thus error when training on the contaminated samples can be lower. Therefore, it can be possible to achieve the attacker's goals using several different hyperparameter strategies, which have different effects on the weights during poisoning.

The original training data for the LFA can be reused. Therefore, there may be no deviation in distribution of the data used for training and retraining. As a result, the weights in the network may see minimal change while performing the attack. The illustrative example can be performed with multiple configurations of training hyperparameters in order to demonstrate efficacy of the disclosed technology with different weight update strategies. Those configurations are shown in Table 800 in FIG. 8. For 2 of the configurations, a standard learning rate of 1e−3 can be used, and for the other 2 configurations, a higher learning rate of 5e−3 can be used with a shorter training time. The trials with a higher learning rate can result in larger initial updates to the weights, and so a difference in accuracy when applying the poisoned update may be larger. The results for these trials are described further below.

FIGS. 9A-C depict hamming distances between weights in the CNN model when using the techniques described herein. FIG. 9A depicts a graph of average hamming distance (HD) between all of the weights in the model before and after stochastic parameter mutation is applied for both 32-bit and 16-bit precision. FIG. 9B is a graph for 32-bit flip probability at different values for $t_p$ (0.01, 0.05, 0.10). FIG. 9C is a graph for 16-bit flip probability at different values for $t_p$ (0.01, 0.05, 0.10). The dotted line in both FIGS. 9B and 9C can mark a final value bit for the corresponding floating point representation ($2^{21}$ for 32-bit and $2^9$ for 16-bit). The sign bit does not flip, while only the 3 least significant exponent bits have a nonzero flip probability (<0.05).

Referring to the FIGS. 9A-C, using the methods and techniques described above and the baseline MNIST classifier, simulations can be run in this illustrative example on a range of values $t_p$=[1.0, 10.0] in increments of 0.2%. For each value of $t_p$, an ecosystem can be generated containing 1,000 mutated versions of the original model. The accuracy of such versions can be compared against the original. 2 metrics can be considered: HD between the weights of models A and B should be as close to 50% as possible and a difference in test accuracy between models A and B should be as close to 0% as possible.

The average HD can be used as a metric to evaluate ambiguity between models from the perspective of an attacker, and can ideally be 50%. In the graphs depicted in FIGS. 9A-C, the vertical line can be positioned at a point on the x-axis corresponding to the final value bit of the given floating point precision, using, for example, the IEEE 754 standard. The probability can be computed by examining how frequently that particular bit flips for every single weight to which stochastic parameter mutation can be applied.

In both cases, most of the value bits have a probability greater than 50% of flipping, while the exponent bits (aside from the 3 least significant bits with <5% probability) and the sign bit do not flip. This can be expected due to the relatively small upper bound on the shift threshold (<10%). Therefore the HD can be defined with respect to the significand, which is the portion of the network impacted by the SPM process. As a result, FIG. 9A shows that the HD increases logarithmically proportional to $t_p$, and approaches 50% for the significand bits. In the 32-bit network, even shifting the weights by 1% of their value can result in over 40% HD between the resulting networks. This shows that a high value of $t_p$ may not be necessary in order to achieve desirable results.

Figure 10B:
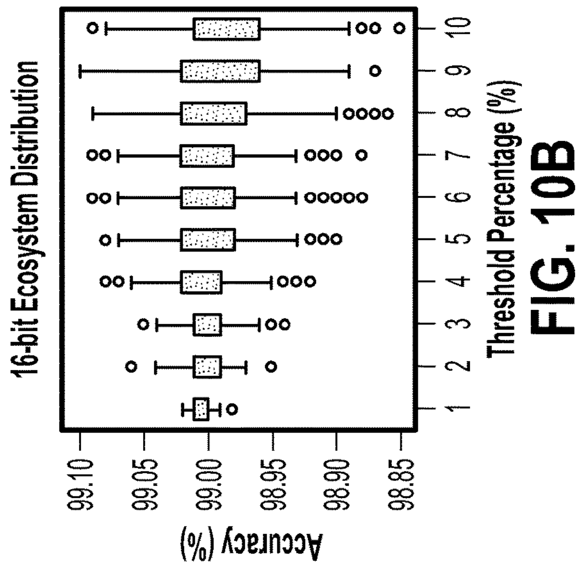
FIGS. 10A-C depict distribution of accuracy across each ecosystem using the techniques described herein.
Figure 10A:
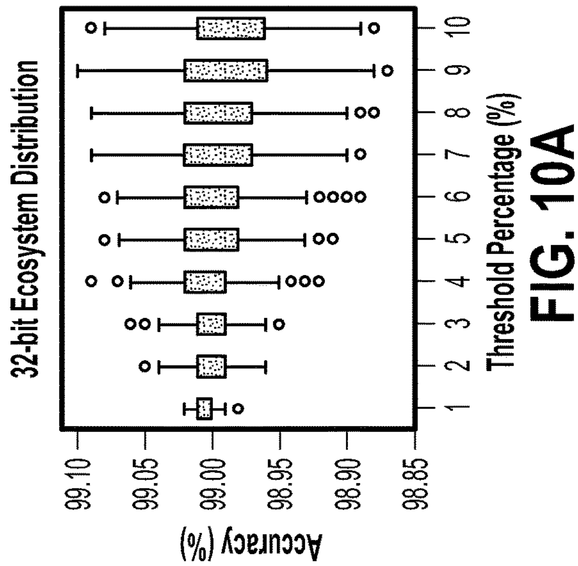
Figure 10C:
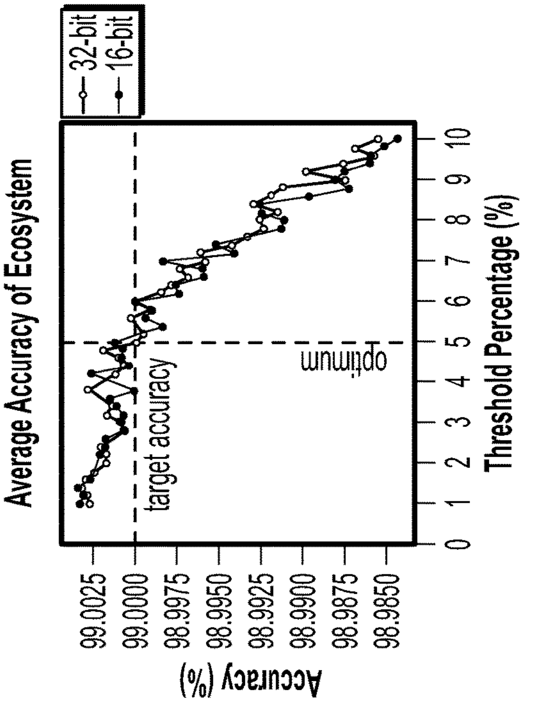

FIGS. 10A-C depict distribution of accuracy across each ecosystem using the techniques described herein. FIG. 10A depicts a graph for distribution of the entire ecosystem for each threshold percentage at 32-bit precision. FIG. 10B depicts a graph for distribution of the entire ecosystem for each threshold percentage at 16-bit precision. FIG. 10C depicts a graph of average trial accuracy of the ecosystem at each threshold level. The cutoff (99%) can be the base accuracy that the model started with, and the optimum (5%) can be the largest value for $t_p$ before the accuracy can degrade from the original model. Anything under the cutoff value can be an undesirable result. With increasing values for $t_p$, there can be a gradual loss in accuracy, although it is relatively small. Even for a high $t_d$ at 10%, the loss in accuracy can be less than 0.02%. Despite this, the ecosystem should not have a drop in accuracy from the original, so an additional cutoff can be drawn at $t_p$=0.05 as the optimum, where the level of diversity can be maximized, but the accuracy may be at or above the baseline and start to degrade shortly past the optimum. Observing $t_p$=0.05 as the optimum, this can be the cutoff value for the illustrative example described herein to measure the affect when poisoning the ecosystem in order to minimize computation.

Referring to the FIGS. 10A-C, with respect to evaluating a relationship between the original model and the ecosystem, a different in trial accuracy of the ecosystem can be minimized as much as possible (e.g., ideally, 0). On a high level, functionality of the networks may not be compromised, and accuracy can be nearly identical, while their structure, in terms of weight values in binary representation, can be significantly different, as indicated by the HD. Hence, it can be possible to diversify the ecosystem of models without compromising integrity of the components.

Figure 11B:
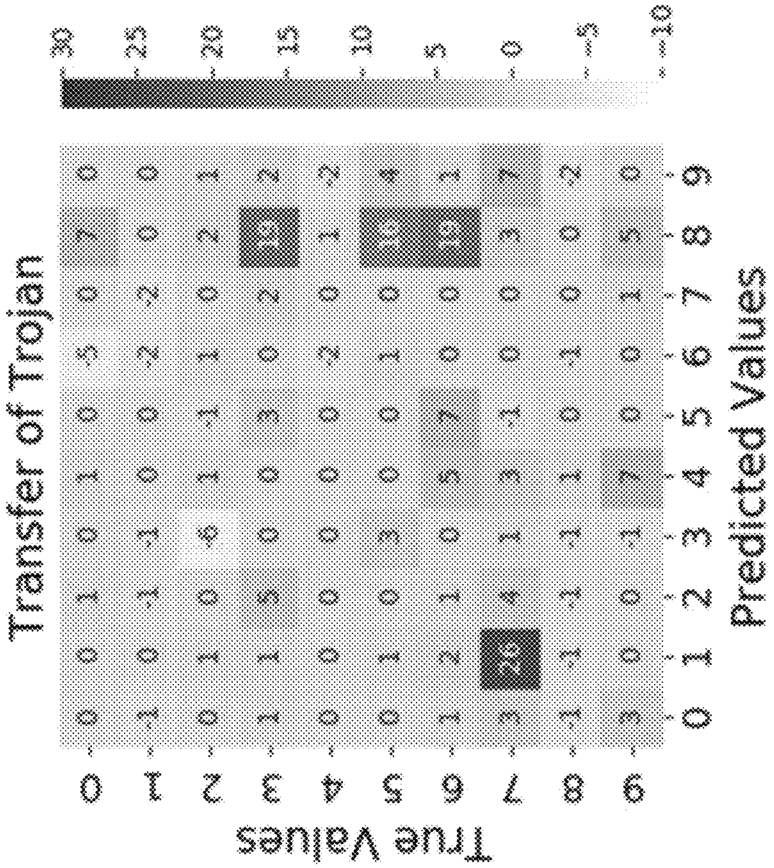
FIGS. 11A-B depict confusion matrices showing differences in classification errors of the CNN model before and after updating.
Figure 11A:
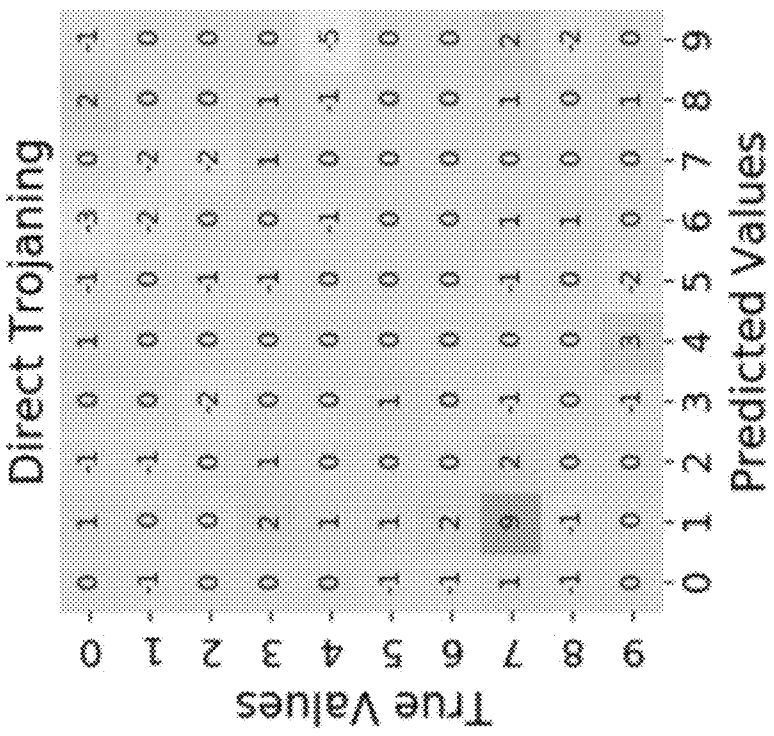

FIGS. 11A-B depict confusion matrices showing differences in classification errors of the CNN model before and after updating. In the illustrative example shown in FIGS. 11A-B, an attacker has access to an arbitrary model $M_i$, and created an update for $M_i$ that can increase an error rate for classifying 1 s as 7 s. The resulting confusion matrix for $M_i$ is shown in FIG. 11A. The attacker can then use that same Trojan'ed update and transfer it to another model in the ecosystem, $M_j$. Using the delta-update procedure as described herein, $M_i$ is updated with $M_i$'s update file. The resulting confusion matrix is shown in FIG. 11B. As shown by the confusion matric, the resulting accuracy for $M_i$ can be identical, and the attacker's goal of targeted misclassification can be achieved. However, for $M_i$, the deltas provided by $M_i$'s update file can break the functionality of $M_i$ and degrade accuracy by a significant amount, thereby making detection of the Trojan attack significantly easier.

Referring to the FIGS. 11A-B, one of the goals of the disclosed technology is that, given an ecosystem of models that perform the same function, the success of an attacker's attempts to Trojan a given network in the ecosystem may not guarantee success if they were to attempt to upload the Trojan to another model in the ecosystem. A Trojan relies on being as stealthy and undetectable as possible. As such, the given Trojan may only be classified as valid if the Trojan does not affect the accuracy of the model. Therefore, the confusion matrices show the difference in performance of the model before and after the delta-update procedure. Negative values indicate that the model made less decisions for that respective prediction and true value pairing, while positive values indicated more decisions for that pairing. Positive values can be a deterioration, while negative values can be an improvement.

In this example of FIGS. 11A-B, the attacker inserted a Trojan into $M_i$ which marginally increased the error rate of class 1 to 7, as shown in FIG. 11A. Overall, the accuracy of the model remains unchanged; therefore, the Trojan was successful because it achieved the attacker's goal of targeted misclassification of 1 to 7, while remaining undetected. The attacker then can upload the Trojan'ed update to another model in the ecosystem, $M_j$, which results in the confusion matrix in FIG. 11B. Consequently as a result of the combined usage of stochastic parameter mutation and delta-update procedures described herein, the stealthiness of the Trojan is lost when attempting to infect another model in the ecosystem. All models in this ecosystem, including $M_j$, were generated using $t_p$=0.05.

Figure 12:
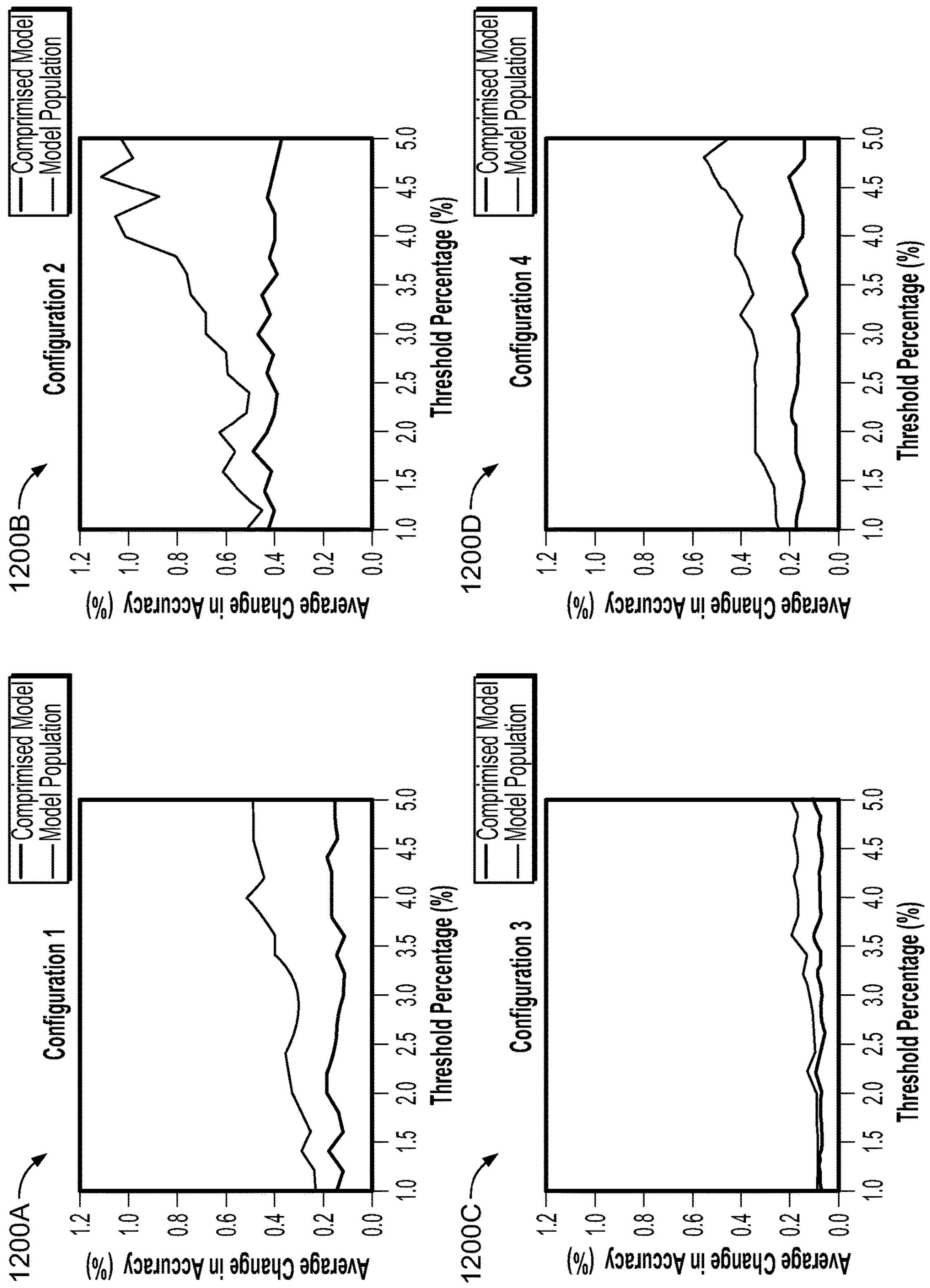
FIG. 12 depicts graphs showing average loss in accuracy as result of mounting an LFA on a singular model and applying its update file to every other network in the ecosystem.

FIG. 12 depicts graphs 1200A-H showing average loss in accuracy as result of mounting an LFA on a singular model and applying its update file to every other network in the ecosystem. Graphs 1200A-D depict results for 32-bit networks and graphs 1200E-H depict results for 16-bit networks. As described herein, 4 different configurations for the hyperparameters can be used in the illustrative example when retraining (poisoning) the network. For each configuration, an ecosystem with n=1,000 can be generated for $t_p$={0.010, 0.012, 0.014, . . . 0.050}. For each value of $t_p$, the ecosystem can be taken and 30 random models can be sampled from it. For each sampled model, the poisoning attack can be performed, then a Trojan'ed update can be generated that can be used for that model. That update can be applied to the other models in the ecosystem. The average drop in accuracy for the sampled model is shown by the blue lines in the graphs 1200A-H (e.g., the lower lines in each of the graphs 1200A-H), while the average drop in accuracy for the ecosystem after applying the update is shown by the orange lines in the graphs 1200A-H (e.g., the upper lines in each of the graphs 1200A-H).

If configurations are to be ordered by the amount they change the weights (and thus accuracy) in ascending order, they would be ordered as such: {$C_3$, $C_1$, $C_4$, $C_2$}. The hyperparameters for configuration 2 (lr=5e−3, batch size=128, epochs=50) can result in the largest change for the weights, which can be expected. This can be indicated by the average drop in accuracy of 0.4% for the targeted model. While this configuration may not be ideal for the attacker, it shows what the result would be for the ecosystem in the presence of a poisoning attack that significantly alters the weights. Among all the configurations, the drop in accuracy for the ecosystem can be 2-3 times greater than that for the model that was attacked directly.

As described herein, the disclosed technology can focus on ensuring that an attacker cannot successfully transfer their Trojan to another device containing the same model, thereby limiting the scale and scope of the attack. Additionally, the disclosed technology can ensure that, if an attacker is snooping and gains information about a particular update for a network, this information does not help them attack any other device in the ecosystem.

It can be assumed that the attacker has access to some device that is running a model from the ecosystem and that they mounted a Trojan and computed an update file for that model. The Trojan'ed model can be denoted as $M_t$, its update as $U_p$, and another arbitrary model in the ecosystem as $M_i$. The difficulty for the attacker arises when they wish to apply $U_p$ to one or more $M_i$. Identifying the difficulty can involve defining some threshold for the floating point values of the weights and determining some way to adjust the values for Δw in $U_p$ to account for this. However, the difficulty can be modeled by considering: 1) how many weights are in the network, W, 2) the floating point precision of the weights $f_i$ (specifically the significands), and 3) the accuracy of the model. Using these values, the difficulty d can be formulated as in Eqn. 1:

$$d=W^{*}\text{opt}(\text{perturb}(f_{val})) \quad (1)$$

For ht $w_i$

For every weight $w_i$ in the network, the attacker computes some value(s) that achieves their goal of activating the respective neuron(s) for the Trojan trigger, while ensuring that the accuracy of the model is not negatively impacted. The complexity of this problem increases relative to the network size and precision of weights used. Further, with a large ecosystem, there may be no guarantee that their malicious update will be effective across other devices. The reason that there is one-to-one mapping for an update to its model is because the XOR procedure of the weights described herein can end up shifting the weights by a large, unintended amount. When this occurs, the impact of the Trojan can be much higher than intended by the attacker, and is thus far less stealthy and easier to detect. Empirically, out of 1,000 networks, 85%, when updated with $U_p$, can see at least 2×decrease in accuracy over $M_t$, which can be detected by a BIST consisting of 10,000 test images. Hence, on an individual basis, the victims can identify the issue and take appropriate action, e.g. rolling back to a baseline network configuration. Moreover, by pooling the post-update accuracy loss from the ecosystem as a whole, the overall impact can be obvious, enabling the manufacturer to take ecosystem-wide corrective action as appropriate.

As a practical example of a real threat scenario, consider an attacker that aims to circumvent the BIST consisting of N test images. If the attacker Trojans the model, and the accuracy drops by 1%, a BIST with N=100 test images can be expected to catch the Trojan, as there would be a difference of 1 additional image that was classified incorrectly. A trial with the MNIST classifier can be performed, where the Trojan can degrade the accuracy by 0.15%. It can be expected to catch the Trojan if a test set is at least N=667 (10,000/15) images. For this same Trojan applied to the ecosystem, the accuracy drops by 0.5%—meaning a misclassification can be expected every N=200 (10,000/50) images. Because of this, the Trojan-inserted network can fail the BIST for most other devices in the ecosystem.

The disclosed technology provides improvements to machine learning security that focuses on protecting an ecosystem of variant devices by diversifying configurations that can expose attacks. Stochastic parameter mutation can be used to allow developers to deploy their model as a diverse ecosystem of architecturally different but functionally equivalent versions of their model. This aspect of diversity can ensure that, in the event where an attacker can successfully mount an attack on one device (e.g., model), they can be unable to translate that same attack to another device. The XOR-based update mechanism delta-update procedure described herein with a built-in self-check can also enable developers to securely update their models in the field. When applying the disclosed technology to larger networks, it may also be possible to only adjust weights of certain layers and still realize a high level of ambiguity across the model ecosystem.

Figure 13:
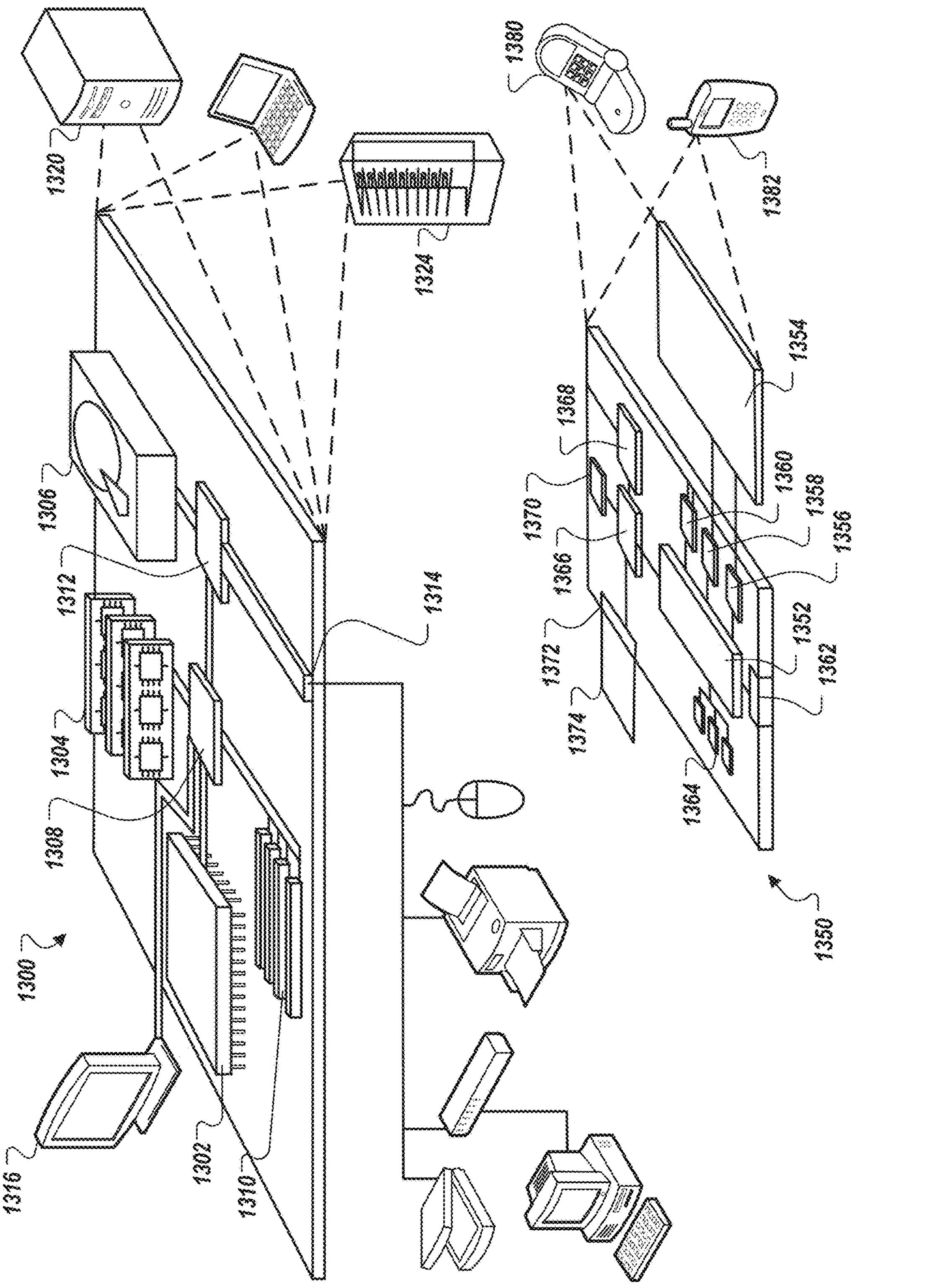
FIG. 13 is a schematic diagram that shows an example of a computing device and a mobile computing device.

FIG. 13 shows an example of a computing device 1300 and an example of a mobile computing device that can be used to implement the techniques described here. The computing device 1300 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1300 includes a processor 1302, a memory 1304, a storage device 1306, a high-speed interface 1308 connecting to the memory 1304 and multiple high-speed expansion ports 1310, and a low-speed interface 1312 connecting to a low-speed expansion port 1314 and the storage device 1306. Each of the processor 1302, the memory 1304, the storage device 1306, the high-speed interface 1308, the high-speed expansion ports 1310, and the low-speed interface 1312, are interconnected using various busses, and can be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as a display 1316 coupled to the high-speed interface 1308. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1304 stores information within the computing device 1300. In some implementations, the memory 1304 is a volatile memory unit or units. In some implementations, the memory 1304 is a non-volatile memory unit or units. The memory 1304 can also be another form of computer-readable medium, such as a magnetic or optical disk.

The storage device 1306 is capable of providing mass storage for the computing device 1300. In some implementations, the storage device 1306 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1304, the storage device 1306, or memory on the processor 1302.

The high-speed interface 1308 manages bandwidth-intensive operations for the computing device 1300, while the low-speed interface 1312 manages lower bandwidth-intensive operations. Such allocation of functions is exemplary only. In some implementations, the high-speed interface 1308 is coupled to the memory 1304, the display 1316 (e.g., through a graphics processor or accelerator), and to the high-speed expansion ports 1310, which can accept various expansion cards (not shown). In the implementation, the low-speed interface 1312 is coupled to the storage device 1306 and the low-speed expansion port 1314. The low-speed expansion port 1314, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1300 can be implemented in a number of different forms, as shown in the figure. For example, it can be implemented as a standard server 1320, or multiple times in a group of such servers. In addition, it can be implemented in a personal computer such as a laptop computer 1322. It can also be implemented as part of a rack server system 1324. Alternatively, components from the computing device 1300 can be combined with other components in a mobile device (not shown), such as a mobile computing device 1350. Each of such devices can contain one or more of the computing device 1300 and the mobile computing device 1350, and an entire system can be made up of multiple computing devices communicating with each other.

The mobile computing device 1350 includes a processor 1352, a memory 1364, an input/output device such as a display 1354, a communication interface 1366, and a transceiver 1368, among other components. The mobile computing device 1350 can also be provided with a storage device, such as a micro-drive or other device, to provide additional storage. Each of the processor 1352, the memory 1364, the display 1354, the communication interface 1366, and the transceiver 1368, are interconnected using various buses, and several of the components can be mounted on a common motherboard or in other manners as appropriate.

The processor 1352 can execute instructions within the mobile computing device 1350, including instructions stored in the memory 1364. The processor 1352 can be implemented as a chipset of chips that include separate and multiple analog and digital processors. The processor 1352 can provide, for example, for coordination of the other components of the mobile computing device 1350, such as control of user interfaces, applications run by the mobile computing device 1350, and wireless communication by the mobile computing device 1350.

The processor 1352 can communicate with a user through a control interface 1358 and a display interface 1356 coupled to the display 1354. The display 1354 can be, for example, a TFT (Thin-Film-Transistor Liquid Crystal Display) display or an OLED (Organic Light Emitting Diode) display, or other appropriate display technology. The display interface 1356 can comprise appropriate circuitry for driving the display 1354 to present graphical and other information to a user. The control interface 1358 can receive commands from a user and convert them for submission to the processor 1352. In addition, an external interface 1362 can provide communication with the processor 1352, so as to enable near area communication of the mobile computing device 1350 with other devices. The external interface 1362 can provide, for example, for wired communication in some implementations, or for wireless communication in other implementations, and multiple interfaces can also be used.

The memory 1364 stores information within the mobile computing device 1350. The memory 1364 can be implemented as one or more of a computer-readable medium or media, a volatile memory unit or units, or a non-volatile memory unit or units. An expansion memory 1374 can also be provided and connected to the mobile computing device 1350 through an expansion interface 1372, which can include, for example, a SIMM (Single In Line Memory Module) card interface. The expansion memory 1374 can provide extra storage space for the mobile computing device 1350, or can also store applications or other information for the mobile computing device 1350. Specifically, the expansion memory 1374 can include instructions to carry out or supplement the processes described above, and can include secure information also. Thus, for example, the expansion memory 1374 can be provide as a security module for the mobile computing device 1350, and can be programmed with instructions that permit secure use of the mobile computing device 1350. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1364, the expansion memory 1374, or memory on the processor 1352. In some implementations, the computer program product can be received in a propagated signal, for example, over the transceiver 1368 or the external interface 1362.

The mobile computing device 1350 can communicate wirelessly through the communication interface 1366, which can include digital signal processing circuitry where necessary. The communication interface 1366 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1368 using a radio-frequency. In addition, short-range communication can occur, such as using a Bluetooth, WiFi, or other such transceiver (not shown). In addition, a GPS (Global Positioning System) receiver module 1370 can provide additional navigation- and location-related wireless data to the mobile computing device 1350, which can be used as appropriate by applications running on the mobile computing device 1350.

The mobile computing device 1350 can also communicate audibly using an audio codec 1360, which can receive spoken information from a user and convert it to usable digital information. The audio codec 1360 can likewise generate audible sound for a user, such as through a speaker, e.g., in a handset of the mobile computing device 1350. Such sound can include sound from voice telephone calls, can include recorded sound (e.g., voice messages, music files, etc.) and can also include sound generated by applications operating on the mobile computing device 1350.

The mobile computing device 1350 can be implemented in a number of different forms, as shown in the figure. For example, it can be implemented as a cellular telephone 1380. It can also be implemented as part of a smart-phone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Figure 14:
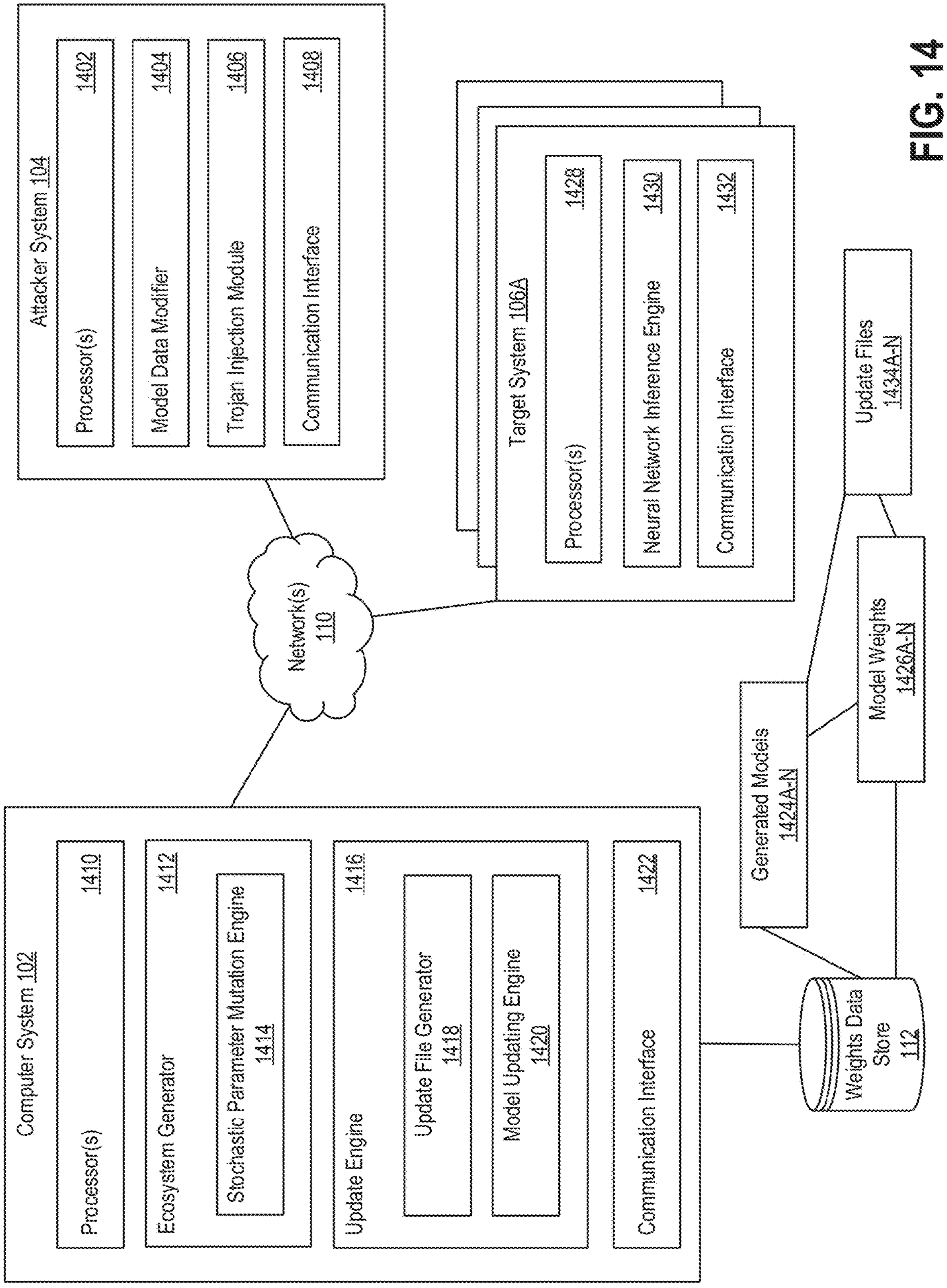
FIG. 14 depicts system components used to perform the techniques described herein.

FIG. 14 depicts system components used to perform the techniques described herein. The computer system 102, attacker system 104, and target system 106A can communicate over the network(s) 110.

The attacker system 104 can include processor(s) 1402, a model data modifier 1404, a Trojan injection module 1406, and a communication interface 1408. The processor(s) 1402 can be configured to perform or execute any one or more of the operations of the attacker system 104. The model data modifier 1404 can receive or extract a training dataset or other data that is used by a network model of the target system 106A. The modifier 1404 can then maliciously change or update that data. The Trojan injection module 1406 can then inject the maliciously updated data back into the target system 106A. The module 1406 can also attempt to inject the maliciously updated data into other similar or same systems as the target system 106A in an ecosystem or environment, as described throughout this disclosure.

The computer system 102 can include processor(s) 1410, an ecosystem generator 1412, an update engine 1416, and a communication interface 1422. Moreover, the computer system 102 can be in communicate with the secure weights data store 112 (e.g., database, cloud storage). The processor(s) 1410 can be configured to perform or execute any of the operations described herein in reference to the computer system 102.

The ecosystem generator 1412 can be configured to receive the network model of the target system 106A and generate variations of the network model having the same functionality. The generator 1412 can include a stochastic parameter mutation engine 1414 to generate the ecosystem. As described throughout this disclosure, the engine 1414 can be configured to shift weights of parameters associated with the network model of the target system 106A.

The update engine 1416 can include an update file generator 1418 and a model updating engine 1420. The generator 1418 can generate an update file to update weights of the parameters of the network model for the target system 106A. The generator 1418 can build the update file using the weights that are generated by the stochastic parameter mutation engine 1414. The model updating engine 1420 can be configured to update the network model of the target system 106A using the update file made by the generator 1418. In some implementations, the computer system 102 can encrypt the update file and transmit the update file to the target system 106A. The target system 106A can then update its network model using the encrypted update file. Therefore, in such implementations, the model updating engine 1420 may not directly update the network model of the target system 106A.

As mentioned, the computer system 102 can be in communication with the secure data store 112. The data store 112 can be configured to store information such as variations of models generated in an ecosystem 1424A-N (wherein the models are generated by the ecosystem generator 1410), model weights 1426A-N (wherein the model weights are generated by the stochastic parameter mutation engine 1414), and update files 1434A-N (wherein the update files are generated by the update file generator 1418). Since information 1424A-N, 1426A-N, and 1434A-N can be securely stored and associated with each other, such information can be applied to other systems in the environment that are the same as the target system 106A. As a result, if the attacker system 104 attempts to spread its Trojan attack to other same systems in the environment, the attack can be amplified in the same systems and therefore more readily and easily identifiable/noticeable.

The target system 106A can include processor(s) 1428, a neural network interface engine 1430, and a communication interface 1432. The processor(s) 1428 can be configured to perform or execute any of the operations described herein in reference to the target system 106A. The neural network interface engine 1430 can be configured to run or implement the neural network model for the target system 106A to, for example, classify objects and perform other functions of the target system 106A. In some implementations, the engine 1430 can update the neural network model for the target system 106A using the update file received from the computer system 102. The engine 1430 can also run the updated neural network model. In some implementations, the engine 1430 can also transmit a notification to the computer system when a Trojan attack is identified.

The communication interfaces 1408, 1422, and 1432 can be configured to provide communication between any one or more of the components described herein.

Figure 15A:
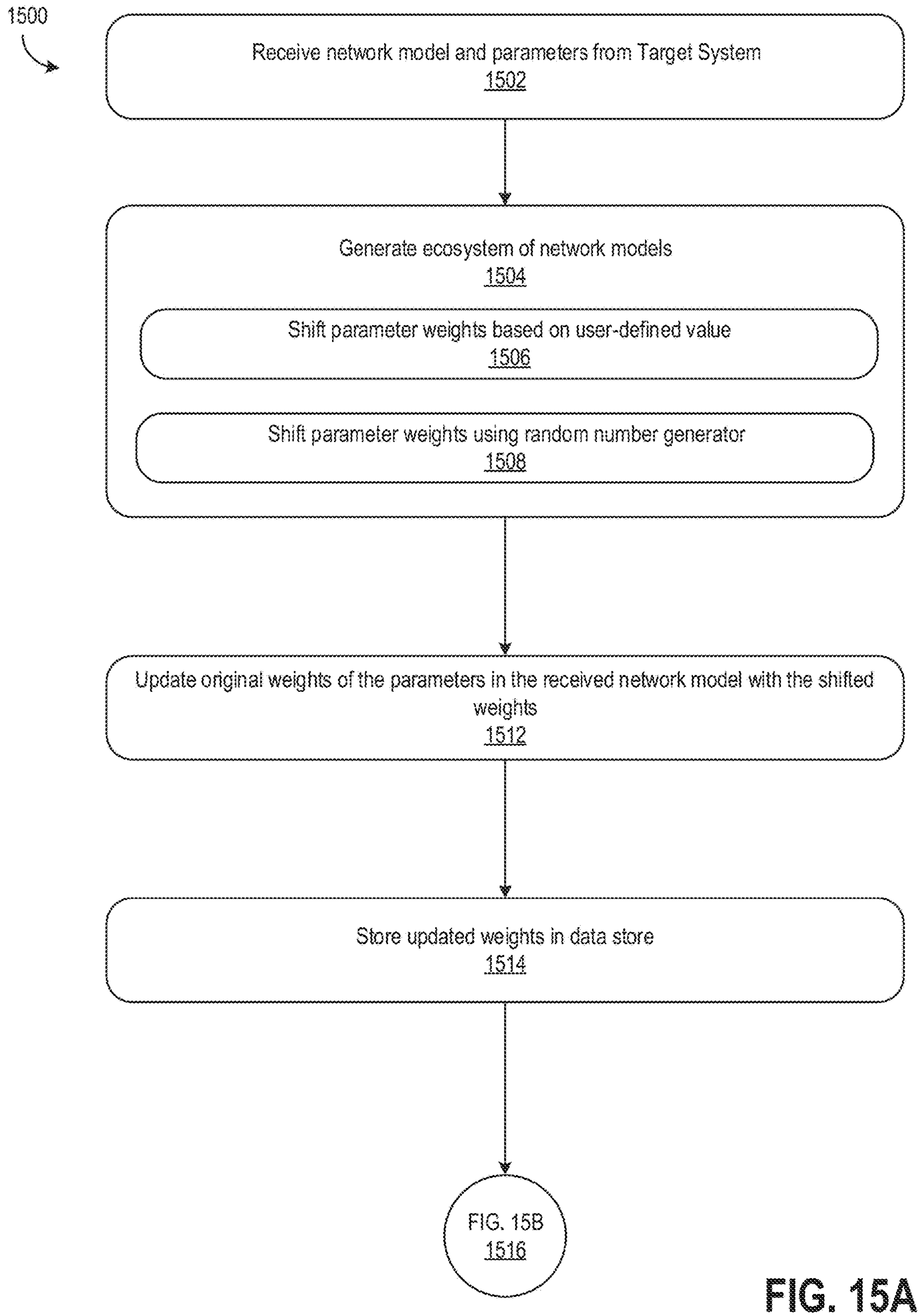
FIGS. 15A-B is a flowchart of a process for performing the techniques described herein.
Figure 15B:
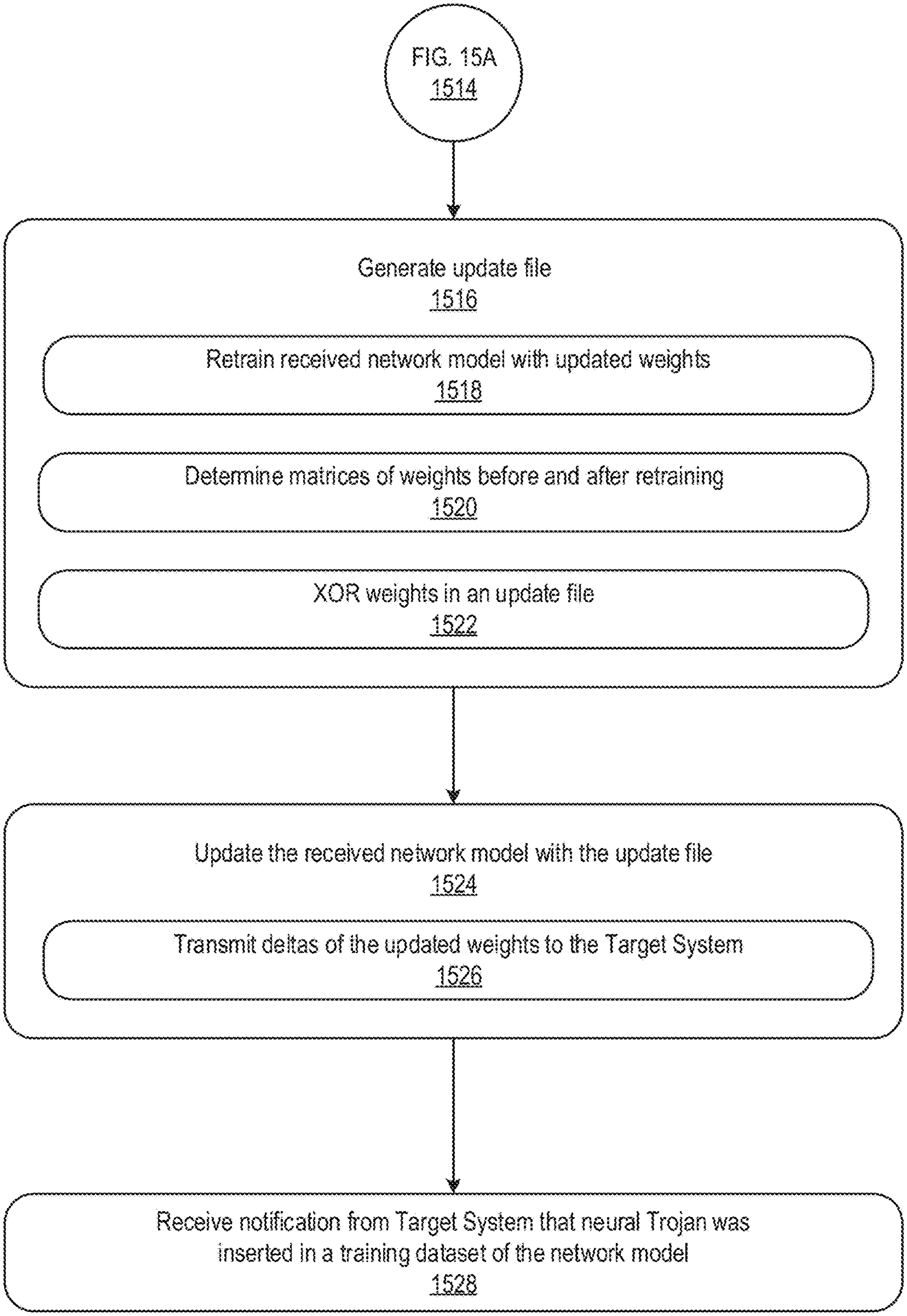

FIGS. 15A-B is a flowchart of a process 1500 for performing the techniques described herein. The process 1500 can be performed by the computer system 102 or any other similar computing system or environment.

Referring to the process 1500 in both FIGS. 15A-B, the computer system 102 can receive a network model and associated parameters from the target system 106A (1502). The computer system 102 can then generate an ecosystem of network models based on the received network model (1504). For example, the computer system 102 can shift, at a first time, weights associated with the parameters of the network model based on user-defined value(s) (1506). The user-defined values can be percentages or other numeric values. The computer system 102 can also shift, at a second time, the weights associated with the parameters using a random number generator (1508). Shifting the weights can result in the model maintaining nearly identical accuracy on testing data to the original model, as described herein.

The computer system 102 can update original weights of the parameters with the shifted weights in 1512. In some implementations, updating the original weights can include added the shifted weights to the original weights. The updated weights of the parameters can then be stored in a secure data store (e.g., the weights data store 112) in 1514.

The computer system 102 can also generate an update file in 1516. This can include retraining the received network model with the updated weights (1518). This can also include determining matrices of weights before and after the retraining (1520). In so doing, the computer system 102 can XOR the weights in an update file (1522). The update file can then be used to update the network model for the target system and also other similar or same systems in the same environment or ecosystem.

The received network model can be updated with the update file in 1524. As described throughout, the computer system 102 can update the network model and transmit the updated network model to the target system. In some implementations, the computer system 102 can transmit deltas of the updated weights to the target system (1526). The target system can then use the deltas to update its network model.

The computer system 102 can also receive a notification from the target system, at a later time in 1528. The notification can indicate that a neural Trojan was identified as being inserted into a training dataset or other data used by the target system's network model.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for identifying malicious neural attacks on a convolutional neural network (CNN) model, the system comprising:

a target computing system that performs classification of objects using a CNN model, wherein the target computing system is configured to generate the CNN model using a training dataset; and an attack identification computing system that identifies the neural attacks, the attack identification computing system configured to:

receive, from the target computing system, the CNN model and parameters associated with the CNN model;

generate, based on the received CNN model and the parameters, an ecosystem of CNN models, wherein generating the ecosystem comprises modifying original weights of the parameters associated with the CNN model by:

shifting, at a first time and based on user-defined values, weights of the parameters associated with the received CNN model; and shifting, at a second time and using a random number generator, the weights of the parameters associated with the received CNN model;

update the original weights of the parameters associated with the CNN model with the modified weights;

store, in a secure data store, the updated weights of the parameters associated with the CNN model;

generate, based on the updated weights, an update file for the received CNN model;

update, using the update file, the received CNN model; and transmit, to the target computing system, the updated CNN model;

wherein the target computing system is further configured to (i) use the updated CNN model and (ii) detect neural attacks by an attacker computing system against the updated CNN model based on the updated CNN model.

2. The system of claim 1, wherein the neural attacks include Neural Trojan attacks that involved injecting malicious data into the training dataset.

3. The system of claim 1, wherein the parameters associated with the CNN model include the training dataset of the CNN model.

4. The system of claim 1, wherein generating the ecosystem of CNN models comprises applying stochastic parameter mutation to the parameters associated with the received CNN model.

5. The system of claim 1, wherein updating the original weights of the parameters associated with the CNN model comprises adding the modified weights to the original weights.

6. The system of claim 1, wherein generating the update file for the received CNN model comprises:

retraining the received CNN model with the updated weights;

determining, based on the retraining, matrices of the updated weights before and after the retraining; and XOR'ing, based on the matrices, the updated weights in the update file.

7. The system of claim 1, wherein updating the received CNN model comprises transmitting, to the target computing system, deltas of the updated weights.

8. The system of claim 1, wherein the target computing system is part of a cluster of other target computing systems, wherein the target computing system is the same as the cluster of other target computing systems.

9. The system of claim 1, wherein modifying the original weights of the parameters associated with the received CNN model comprises shifting the original weights by a predetermined threshold value.

10. The system of claim 9, wherein the predetermined threshold value is 1%.

11. The system of claim 1, wherein:

the attack identification computing system is further configured to:

encrypt the update file; and transmit, to the target computing system, the encrypted update file; and wherein the target computing system is configured to:

receive, from the attack identification computing system, the encrypted update file;

decrypt the encrypted data file; and update the CNN model using the decrypted data file.

12. The system of claim 1, wherein the target computing system is configured to classify objects in an environment using the CNN model.

13. The system of claim 1, wherein the target computing system is at least one of a self-driving vehicle, an Internet of Things (IoT) device, and an artificial intelligence (AI) device.

14. The system of claim 1, wherein:

the target computing system is further configured to transmit an alert to the attack identification computing system in response to detecting the neural attacks, and the attack identification computing system is further configured to (i) receive the alert from the targeting computing system and (ii) transmit identification of the neural attacks to other computing systems using the CNN model.

15. A system for identifying malicious neural attacks on a convolutional neural network (CNN) model, the system comprising:

a target computing system that performs classification of objects using a CNN model, wherein the target computing system is configured to generate the CNN model using a training dataset; and an attack identification computing system that identifies the neural attacks, the attack identification computing system configured to:

receive, from the target computing system, the CNN model and parameters associated with the CNN model;

generate, based on the received CNN model and the parameters, an ecosystem of CNN models, wherein generating the ecosystem comprises modifying original weights of the parameters associated with the CNN model;

update the original weights of the parameters associated with the CNN model with the modified weights;

store, in a secure data store, the updated weights of the parameters associated with the CNN model;

generate, based on the updated weights, an update file for the received CNN model by:

retraining the received CNN model with the updated weights;

determining, based on the retraining, matrices of the updated weights before and after the retraining; and XOR'ing, based on the matrices, the updated weights in the update file;

update, using the update file, the received CNN model; and transmit, to the target computing system, the updated CNN model;

wherein the target computing system is further configured to (i) use the updated CNN model and (ii) detect neural attacks by an attacker computing system against the updated CNN model based on the updated CNN model.

16. The system of claim 15, wherein the parameters associated with the CNN model include the training dataset of the CNN model.

17. The system of claim 15, wherein generating the ecosystem of CNN models comprises applying stochastic parameter mutation to the parameters associated with the received CNN model.

18. The system of claim 15, wherein generating the ecosystem of CNN models further comprises:

shifting, at a first time and based on user-defined values, weights of the parameters associated with the received CNN model; and shifting, at a second time and using a random number generator, the weights of the parameters associated with the received CNN model.

19. The system of claim 15, wherein the target computing system is at least one of a self-driving vehicle, an Internet of Things (IoT) device, and an artificial intelligence (AI) device.

20. The system of claim 15, wherein:

the target computing system is further configured to transmit an alert to the attack identification computing system in response to detecting the neural attacks, and the attack identification computing system is further configured to (i) receive the alert from the targeting computing system and (ii) transmit identification of the neural attacks to other computing systems using the CNN model.

* * * * *